(12) United States Patent
Yamamoto et al.

(10) Patent No.: US 11,255,771 B2
(45) Date of Patent: Feb. 22, 2022

(54) PHOTON SIGNAL PROCESSING FOR PARTICLE DETECTION

(71) Applicant: CAPTL LLC, West Lafayette, IN (US)

(72) Inventors: Masanobu Yamamoto, West Lafayette, IN (US); J. Paul Robinson, West Lafayette, IN (US); Keegan Hernandez, Chicago, IL (US)

(73) Assignee: CAPTL LLC, West Lafayette, IN (US)

( * ) Notice: Subject to any disclaimer, the term of this patent is extended or adjusted under 35 U.S.C. 154(b) by 0 days.

(21) Appl. No.: 16/908,638

(22) Filed: Jun. 22, 2020

(65) Prior Publication Data
US 2020/0400547 A1  Dec. 24, 2020

Related U.S. Application Data

(60) Provisional application No. 62/865,107, filed on Jun. 21, 2019.

(51) Int. Cl.
*G01N 15/14* (2006.01)

(52) U.S. Cl.
CPC ..... *G01N 15/1429* (2013.01); *G01N 15/1434* (2013.01)

(58) Field of Classification Search
CPC ........... G01N 15/1429; G01N 15/1434; G01N 15/1436; G01N 15/14; G01N 2015/1006
See application file for complete search history.

(56) References Cited

U.S. PATENT DOCUMENTS

| | | | | |
|---|---|---|---|---|
| 7,709,248 | B2* | 5/2010 | Yamatsu | G01N 21/6428 435/287.2 |
| 9,057,676 | B2* | 6/2015 | Sharpe | G01N 15/1459 |
| 9,134,221 | B2* | 9/2015 | Lo | G01N 15/1484 |
| 9,677,990 | B2* | 6/2017 | Pariseau | G01N 15/1459 |
| 10,036,698 | B2* | 7/2018 | Yamamoto | G01N 15/1475 |
| 10,775,292 | B2* | 9/2020 | Yamamoto | G01N 15/147 |
| 10,900,885 | B2* | 1/2021 | Yamamoto | G01N 15/1459 |
| 2011/0063602 | A1* | 3/2011 | Pittaro | G01N 15/14 356/28 |
| 2013/0226469 | A1* | 8/2013 | Robinson | G06F 15/00 702/27 |
| 2016/0103056 | A1* | 4/2016 | Vacca | G01N 15/1429 250/576 |

(Continued)

*Primary Examiner* — John R Lee
(74) *Attorney, Agent, or Firm* — Piroozi-IP, LLC

(57) ABSTRACT

A photon-accounting system for use with a flow cytometry system is disclosed which includes a signal shaping subsystem, including a differentiator configured to generate a differentiated output of photodiode signals into corresponding zero-crossings each associated with one of the received photons, a comparator configured to receive the differentiated signal and compare to a threshold to thereby generate a comparator output digital signal associated with the crossing of the differentiated signal about the threshold, a front-end synchronization system adapted to receive and synchronize the comparator generated digital signal to a clock, thereby generate synchronized photon data with the clock and associated with the asynchronized photodiode signal, and a timestamping system adapted to receive the synchronized data as a bit stream and generate a timestamp associated with each photon data.

14 Claims, 36 Drawing Sheets
(20 of 36 Drawing Sheet(s) Filed in Color)

(56) References Cited

U.S. PATENT DOCUMENTS

| | | | | |
|---|---|---|---|---|
| 2016/0161390 A1* | 6/2016 | Greiner | ............... | G01N 21/64 |
| | | | | 702/24 |
| 2016/0370280 A1* | 12/2016 | Yamamoto | ......... | G01N 15/1427 |
| 2019/0353578 A1* | 11/2019 | Polyakov | ........... | G01N 15/1459 |
| 2020/0400547 A1* | 12/2020 | Yamamoto | ......... | G01N 15/1429 |
| 2021/0025757 A1* | 1/2021 | Yamamoto | ............... | G01J 3/18 |

* cited by examiner

PHOTON SIGNAL PROCESSING FOR PARTICLE DETECTION

CROSS-REFERENCE TO RELATED APPLICATIONS

The present patent application is related to and claims the priority benefit of U.S. Provisional Patent Application Ser. No. 62/865,107, filed Jun. 21, 2019, the contents of which is attached hereto as Appendix-A and also hereby incorporated by reference in its entirety into the present disclosure.

STATEMENT REGARDING GOVERNMENT FUNDING

None.

TECHNICAL FIELD

The present disclosure relates to flow cytometry, and in particular to a system and a sensor used therein suitable for single photon detection.

BACKGROUND

This section introduces aspects that may help facilitate a better understanding of the disclosure. Accordingly, these statements are to be read in this light and are not to be understood as admissions about what is or is not prior art.

Flow cytometry is ubiquitously used in the fields related to life sciences such as genetics, immunology, molecular biology, and environmental science. In general terms, flow cytometer/cytometry refers to a systems/method used to i) detect, and once detected ii) measure physical and chemical attributes of particles moving along with a sheath fluid across an interrogation window such that only one such particle appears at a time for interrogation. Typically a source of light is used to shine light at various wavelengths onto such particles. Light that is incident on such particles is scattered, typically in a forward or side scatter and detected by photodetectors positioned about the direction of such scatters. Light scattered from the particles are considered as emissions. These photodetectors are typically photodiodes or photomultiplier tubes. In both cases, detectors generate electrons when excited by photons of the emitted light from the particles. Typically the current from the excited electrons is measured and labeled as the photocurrent. The photocurrent can be correlated to general population data of the particles, some information about heterogeneity of the population. Common light sources includes lasers. Common lasers include ultraviolet (UV) having a wavelength of 355 nm to 360 nm, violet having a wavelength of 405 nm to 407 nm, blue having a wavelength of 488 nm, red having a wavelength of 633 nm, yellow having a wavelength of 561 nm, and green having a wavelength of 532 nm. Blue laser is found to be the most common.

The current flow cytometers provide useful but limited information about population of particles including cells. Use of this technique allows scientist to make measurements on a large number of particles in a relatively short period of time. Towards this end, the current flow cytometer systems provide the basis for a robust statistical analyses, giving way quantitative analyses of features. However, the information that these system provide are limited to population-based analyses. For example, information about heterogeneity of the population can be obtained from current flow cytometers. However, specific information about particles/cells, e.g., receptor sites, are seriously limited. Advances in the field have not been able to address these issues. Advances include deploying multiple lasers, hydrodynamic and acoustic focusing of particles in the flow tube, high-speed flows, and flow cytometry imaging. However, none of these advances address the baseline issue: photocurrent provides information about a stream of photons and at most statistical information can be obtained with limited sensitivity, insufficient for precise detailed analyses of particle/cellular features.

Therefore, there is an unmet need for a novel flow cytometer system that can provide heightened sensitivity allowing discrimination between particle/cellular features.

SUMMARY

A signal shaping sub-system for use with a flow cytometry system is disclosed. The photon-accounting system includes a signal shaping sub-system. The signal shaping sub-system includes a differentiator that is configured to be coupled to one or more Geiger-mode photodiodes providing a capacitively coupled signal from the photodiodes. The signal form the one or more Geiger-mode photodiodes includes a combination of avalanche portions and recharge portions associated with receiving photons overlaid on one-another. The differentiator is configured to generate a differentiated output of the signal into corresponding zero-crossings each associated with one of the received photons. The signal shaping sub-system further includes a comparator that is configured to receive the differentiated signal and compare to a threshold to thereby generate a comparator output digital signal associated with the crossing of the differentiated signal about the threshold. signal shaping sub-system further includes a front-end synchronization system adapted to receive and synchronize the comparator generated digital signal to a clock to thereby generate synchronized photon data with the clock and associated with the asynchronized photodiode signal. The signal shaping sub-system also includes a timestamping system adapted to receive the synchronized data as a bit stream and generate a timestamp associated with each photon data.

BRIEF DESCRIPTION OF DRAWINGS

The patent or application file contains at least one drawing executed in color. Copies of this patent or patent application publication with color drawing(s) will be provided by the Office upon request and payment of the necessary fee.

FIG. 10c shows an example output from that circuit.

FIG. 11b is output of the circuit shown in FIG. 11a.

FIG. 11c is a circuit of an example filter section in an envelope-detector of that shown in FIG. 11a.

FIG. 12b is a timing diagram showing interim signals of the circuit shown in FIG. 12a.

FIG. 17 is a timing diagram is provided to show the timing relationship of the frontend digital circuit of FIG. 16a.

DETAILED DESCRIPTION

Figure 1:
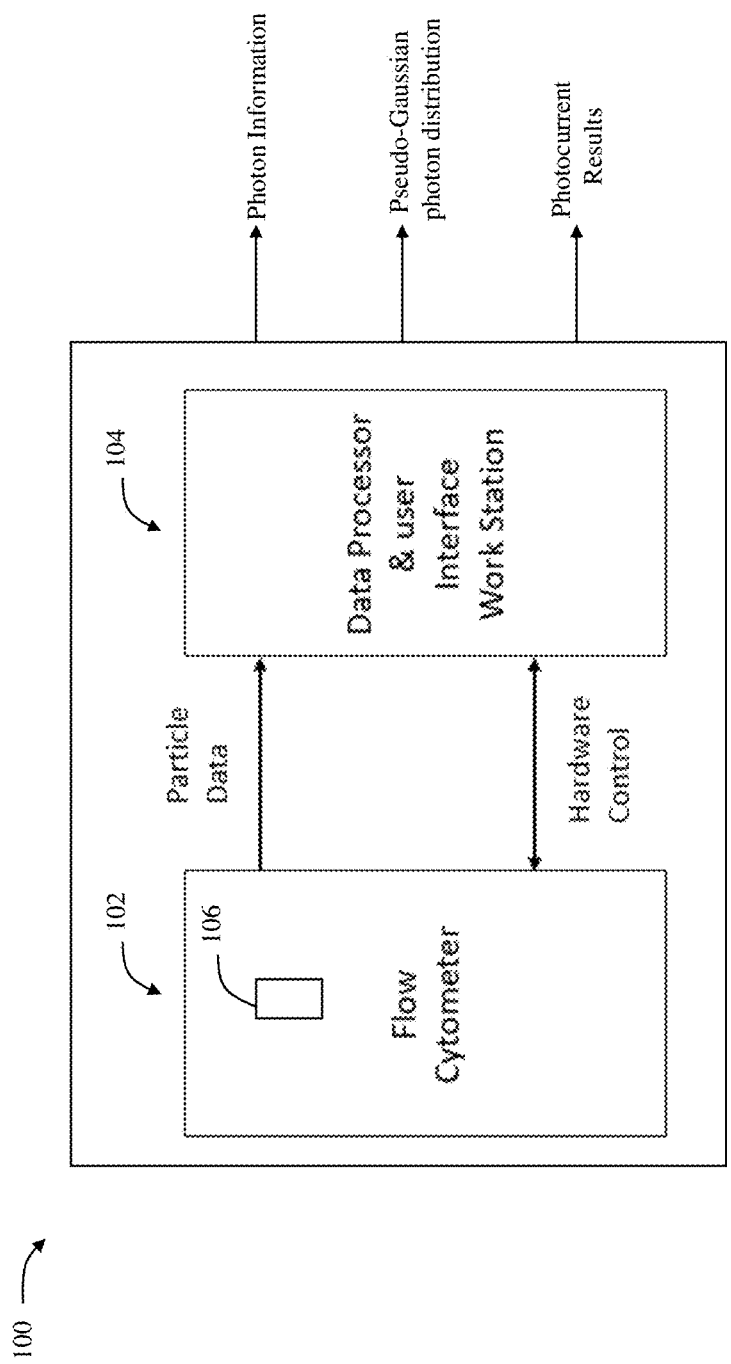
FIG. 1 is a block diagram of a flow cytometry system and its data flow between a flow cytometer and a data processor and user interface workstation (or also referred to herein as a processor system).

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure, the term "about" can allow for a degree of variability in a value or range, for example, within 10%, within 5%, or within 1% of a stated value or of a stated limit of a range.

In the present disclosure, the term "substantially" can allow for a degree of variability in a value or range, for example, within 90%, within 95%, or within 99% of a stated value or of a stated limit of a range.

A novel flow cytometer system is disclosed that can provide heightened sensitivity allowing discrimination between particle/cellular features. The novel system provides simultaneous capabilities to measure photocurrent from photodetectors as well as detect and count photons which allows absolute quantification of particle and cellular features. Towards this end, the novel system receives photons at photosensors which excite corresponding electrons that are sensed, synchronized against a clock, and time addressed for enhanced analysis using a Gaussian photonic profile thereby generating pseudo-photocurrent waveform from individually detected photons. Simultaneously, the system of the present disclosure is capable of measuring photocurrent and thus provide a direct photocurrent results. In addition, the present disclosure describes a novel photosensor capable of sensing photons thereby generating an electronic signal associated with each photon, with selective passive-active quenching, synchronizing an otherwise asynchronous electronic signal, and placing the synchronized signal into high-speed memory utilizing direct memory access for superior overall response time generating extremely high sensitivity.

Referring to FIG. 1, a block diagram of a flow cytometry system 100 and its data flow between a flow cytometer 102 and a data processor and user interface workstation 104 (or also referred to herein as a processor system 104). Within the flow cytometer 102 is a sensor system 106 responsible for detecting particles. Particle data is transferred from the flow cytometer 102 to the processor system 104. The processor system 104 in turn controls hardware of the flow cytometer 102 and there are signals from the flow cytometer 102 controlling user interface of the processor system 104. From a high level, the flow cytometry system 100 is capable of providing individual photon information, e.g., time of arrival; a pseudo-Gaussian photon distribution from the photon data, and a simultaneous photocurrent from the received light upon the photosensors.

Figure 2:
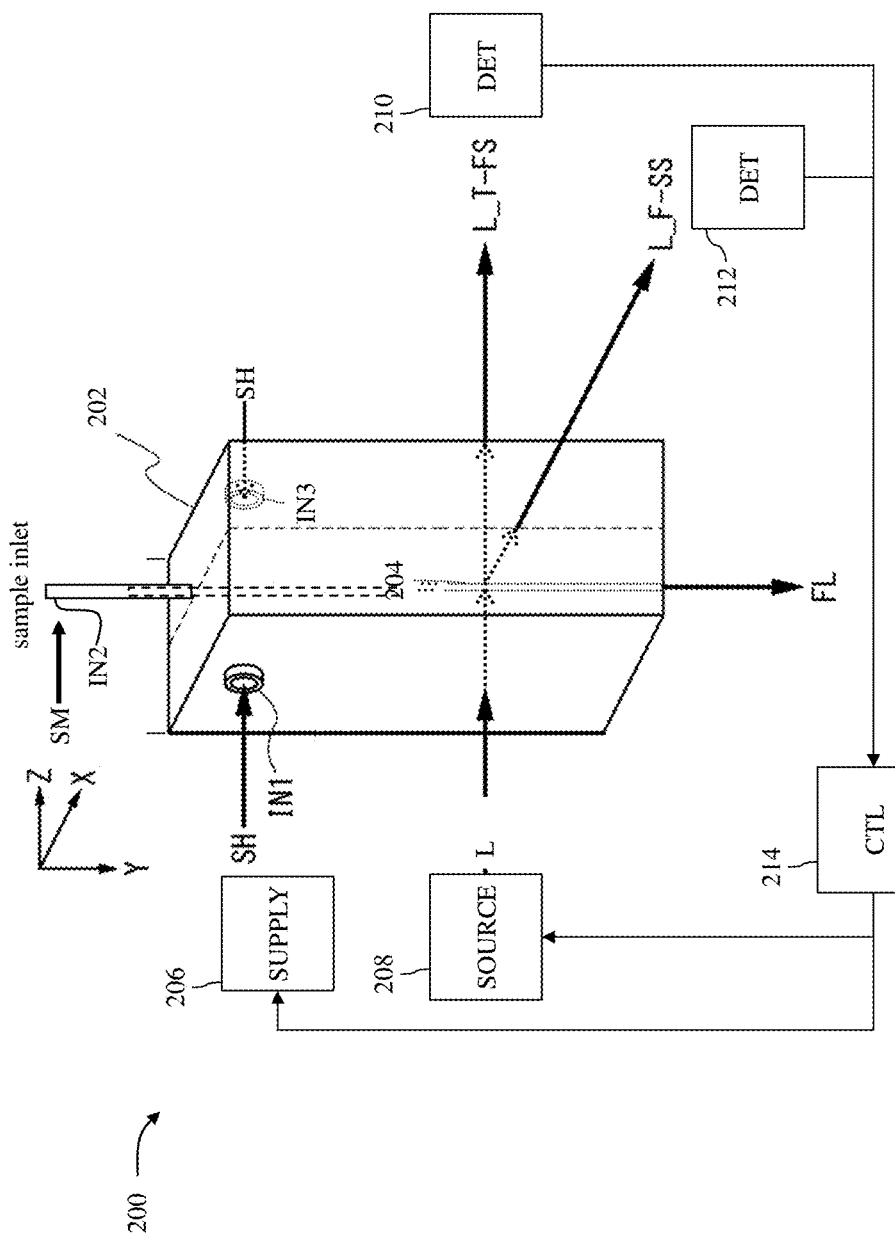
FIG. 2 is a schematic of the flow cytometer of FIG. 1.

An example of the flow cytometer 102 is shown in FIG. 2. Referring to FIG. 2, a schematic of a flow cytometer 200 is provided. The flow cytometer 200 can be used with sensors and detection systems described herein. The flow cytometer 200 includes a flow cell 202. The flow cell 202 includes a flow chamber 204, and is, at least in part, transparent or substantially transparent to irradiation such as incident light L from a light source 208. Resultant light also referred to herein as emission light are emitted from the flow chamber 204 when a particle, e.g., a cell, passes through the chamber. The emission light are based on forward and side scatter, such as light L_T FS (forward scatter) and L_T SS (side scatter). Without a particle in the flow chamber 204, the light is substantially without scatter. For clarity, only part of the flow chamber 204 is shown. Further details of various configurations of the flow chamber 204 are discussed below. As shown, the flow cell 202 can be 2 mm thick along the direction of propagation of light L, however, other dimensions are within the ambit of the present disclosure. The narrowness of the flow chamber 204 within the flow cell 202 is related to hydrodynamic focusing, which is a concept of narrowing the flow chamber 204 so that only one particle can pass at a time. As such, Hydrodynamic focusing is actually the narrowing of the core stream (containing particles) so that the velocity increases, separating particles so that a single particle can be analyzed in the absence of another. As the sheath fluid compresses the core, the velocity increases and the particle remains in the center of the stream to enhance stability of particle location. However, if the particles are not centered improper scattering results. Therefore, hydrodynamic focusing alone may not be sufficient. To further improve centering of particles in the flow chamber 204, acoustic focusing, known to a person having ordinary skill in the art may also be implemented to center particles within the flow chamber 204 for proper positioning.

A sheath flow SH flows into the flow cell 202 from an inlet port IN1. For example, saline, which is an isotonic liquid, or water, can be used as the sheath flow SH. However, the sheath flow SH is not limited to saline, but various types of liquid such as water, other aqueous solutions (whether isotonic or not), and organic solvents can be used. In various examples, the sheath flow SH also flows into the flow cell 202 from at least one additional inlet port, shown as IN3. Multiple ports allow the sheath to "escape" (to thereby balance input-output) as the amount that can leave the orifice is very small even though the stream is moving much faster.

Further, a sample flow SM including microparticulate samples or other targets to be analyzed flows into the flow cell 202 from an inlet port IN2. For example, saline, which is an isotonic liquid, can be used as the sample flow SM. However, the sample flow SM is not limited to saline, but various types of liquid such as water, other aqueous solutions (whether isotonic or not), and organic solvents can be used. The inflow pressure of the sample flow SM can be higher than or lower than the inflow pressure of the sheath flow SH. The flow chamber 204 or other fluid channels in the flow cell 202 can be arranged so that the center of the sample flow is fastest and the flow velocity is near zero at the walls of the flow channel 204. This can cause targets to be hydrodynamically focused, i.e., positioned by the sheath fluid flow, substantially in the center of the sample flow. In the illustrated example, the fluid flows SM and SH are provided by a fluidic supply 206. It should be noted that sample may flow in the upward or downward directions depending on the instrument design (analyzers typically flow up to prevent air bubbles causing turbulence and sorter always flow down).

The inlet ports IN1, IN2, IN3 can be bored, molded, or otherwise formed in the flow cell 202. In an example, the flow cell 202 includes glass or quartz. For example, flow channels (e.g., flow chamber 204) can be formed by microblasting of quartz sheets. Ports IN1, IN2, IN3 can be drilled out of the quartz sheets. Other etching and boring techniques can be used to form flow channels, inlets, and other features. For example, sample channels, including the flow chamber 204, can be etched, and sheath channels can be microblasted using a mask to define the desired pattern. In other examples, channels and other cavities described herein can be injection molded, molded using other techniques, bored, or etched.

The sheath flow SH and the sample flow SM merge in the flow chamber 204, so that a flow F is provided in which the sample flow SM is substantially hydrodynamically focused with the sheath flow SH, e.g., around the sample flow SM, or arranged in other hydrodynamic-focusing configurations. The flow F can be discharged to the outside of the flow cell 202 in some examples. The flow F can move at a predetermined flow rate. The flow rate can be expressed as volumetric flow rate (e.g., in μL/s or mL/min), or as linear flow rate of a sample (e.g., a microparticle) hydrodynamically focused within, and moving with, the sample flow (e.g., in m/s).

The optical source 208, e.g., a laser or other illumination source, can provide light L aimed, focused, or otherwise directed to irradiate the targets entrained within the sample flow SM. The laser light L incident on a particle can be at least partly transmitted or at least partly scattered, providing resultant forward-scattered light L_T FS and resultant side-scattered light included in L_F SS. Targets, e.g., chromophores bound to target molecules of interest, can fluoresce, producing resultant fluorescent light also included in L_F SS. A detector 210, e.g., an on-axis detector, can detect light L_T FS. A detector 212, e.g., a perpendicular detector, can detect light L_F SS. Various embodiments can use one detector or more than one detector. Detectors can be placed at any angle with respect to the axis of the light L.

According to various embodiments, the light source 208 can be various types of lasers. For example, the light source can be one or more of ultraviolet (UV) having a wavelength of 355 nm to 360 nm (also 325 nm and 349 nm are used), violet having a wavelength of 405 nm to 407 nm, blue having a wavelength of 488 nm, green having a wavelength of 532 nm, yellow having a wavelength of 561 nm, and red having a wavelength of 633 nm or near IR at 808 nm. In addition, according to one embodiment, the optical source 208 includes a laser and conjugate focusing optics, and detector 210 includes a motorized monochromator, one or more silicon photomultipliers (SiPM), and a Geiger-mode differential detection circuit, further described below.

In some examples, a controller ("CTL") 214 controls operation of the fluidic supply 206 or the optical source 208. In some examples, controller 214 receives information, e.g., photon counts, from detectors 210, 212. In other examples, the controller 214 is placed in the processor system 104 (see FIG. 1).

Figure 3:
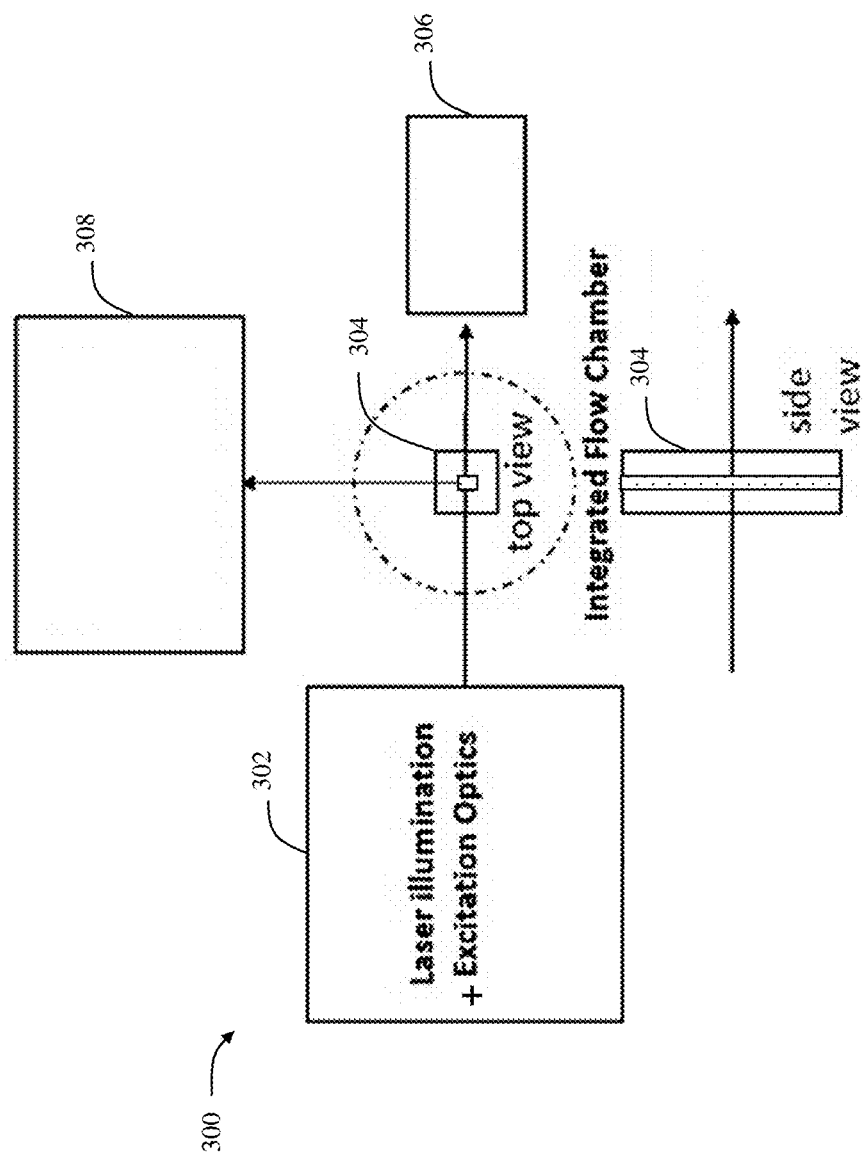
FIG. 3 is detailed block diagram of optical system of a flow cytometer.

Referring to FIG. 3, a more detailed block diagram of optical system 300 of a flow cytometer is shown. FIG. 3 represents both a top view as well as a sideview. As discussed above, a light source and the associated optical elements, e.g., lenses, 302 provide incident light on to a flow chamber 304 which then causes forward and side scatter when the light strikes a particle, e.g., a cell in the flow chamber 304. Various detectors and their associated optics 306 and 308 are shown as detectors and optical elements for forward and side scatter, respectively.

Figure 4:
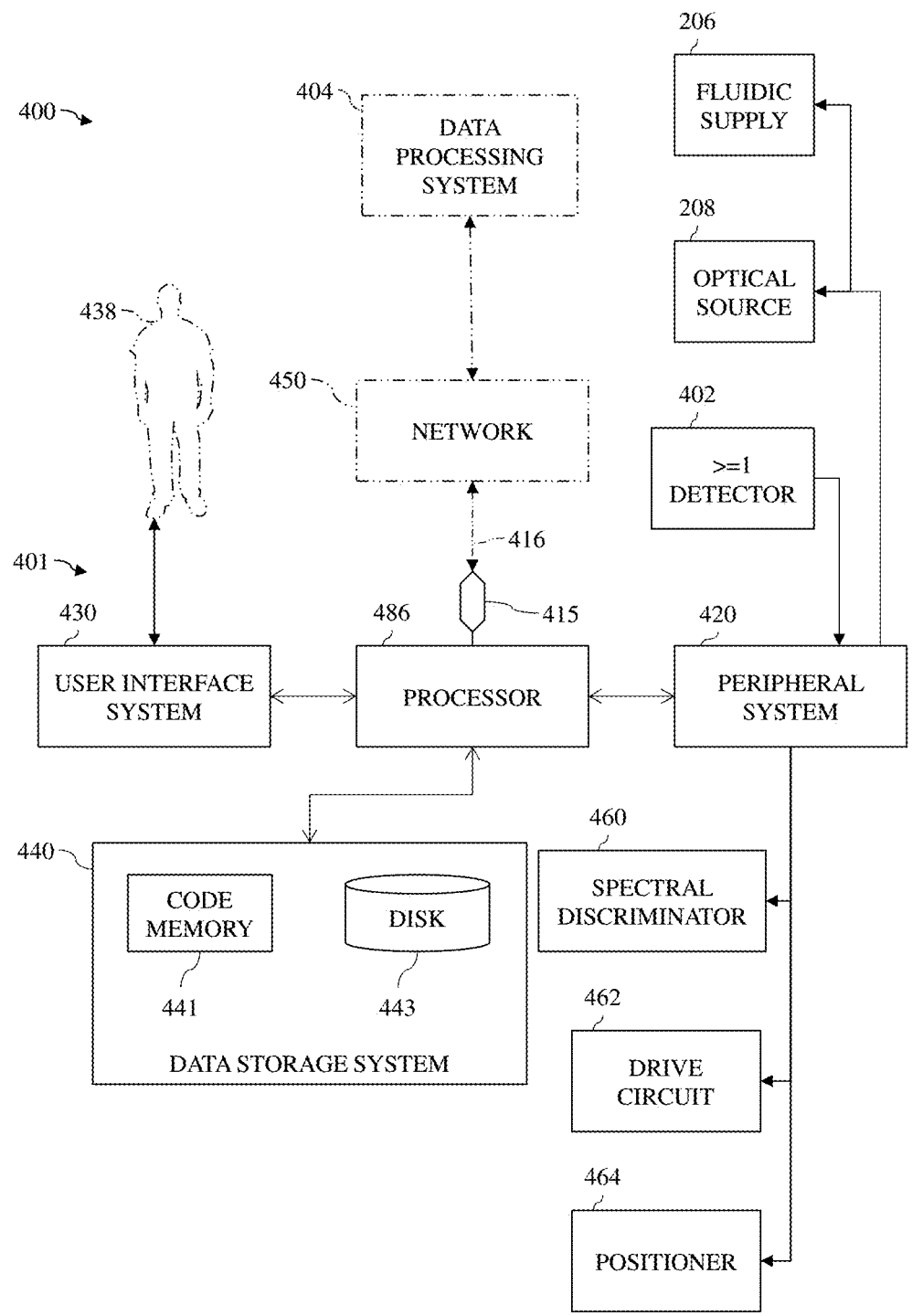
FIG. 4 is a high-level diagram showing the components of an example data-processing system for controlling measurement systems, measuring data, analyzing data, or performing other functions of a flow cytometry system of FIG. 1.

Referring to FIG. 4, a more detailed block diagram of the block diagram shown in FIG. 1 is provided. FIG. 4 is a high-level diagram 400 showing the components of an example data-processing system 401 (which may represent processor system 104 of FIG. 1) for controlling measurement systems, measuring data, analyzing data, or performing other functions described herein, and related components. The system 401 includes a processor 486, a peripheral system 420, a user interface system 430, and a data storage system 440. The peripheral system 420, the user interface system 430, and the data storage system 440 are communicatively connected to the processor 486. Processor 486 can be communicatively connected to network 450 (shown in phantom), e.g., the Internet or a leased line, as discussed below. Devices above can each be or include one or more of systems 401, 486, 420, 430, or 440, and can each connect to one or more network(s) 450. Processor 486, and other processing devices described herein, can each include one or more microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs).

Processor 486 can implement processes of various aspects described herein. Processor 486 and related components can, e.g., carry out processes for detecting photons, collecting count data from counters, operating a laser (e.g., adjusting the laser power), operating a monochromator (e.g., to scan across a wavelength band), or operating a fluid supply or other components of a flow cytometer 102 as in FIG. 1.

Processor 486 can be or include one or more device(s) for automatically operating on data, e.g., a central processing unit (CPU), microcontroller (MCU), desktop computer, laptop computer, mainframe computer, personal digital assistant, digital camera, cellular phone, smartphone, or any other device for processing data, managing data, or handling data, whether implemented with electrical, magnetic, optical, biological components, or otherwise.

The phrase "communicatively connected" includes any type of connection, wired or wireless, for communicating data between devices or processors. These devices or processors can be located in physical proximity or not. For example, subsystems such as peripheral system 420, user interface system 430, and data storage system 440 are shown separately from the processor 486 but can be stored completely or partially within the processor 486.

The peripheral system 420 can include or be communicatively connected with one or more devices configured or otherwise adapted to provide digital content records to the processor 486 or to take action in response to processor 486. For example, the peripheral system 420 can include digital still cameras, digital video cameras, cellular phones, or other data processors. The processor 486, upon receipt of digital content records from a device in the peripheral system 420, can store such digital content records in the data storage system 440. In the illustrated example, the peripheral system 420 permits the processor 486 to control fluidic supply 206 (see FIG. 2) and optical source 208 (see FIG. 2).

The peripheral system 420 also permits the processor 486 to receive data from detector(s) 402. Detectors 402 can include optical detectors, split photodiode; split or position-sensitive photodiode; photon sensor, photodiode(s), single or arrayed Si avalanche photodiode(s) (SiPMs). Additionally or alternatively, the detectors 402 may include customized integrated circuits which include various elements such as active quenching, analog-to-digital converters, digital synchronization circuits, and onboard memory for extreme fast logging of photon data, as described below. Additionally or alternatively, detectors 402 can include electrical detectors, including a photocurrent detector including dQ/dt, LPF/integrator, upper ADC, photon charge detection blocks including integrating amplifier, lower ADC, Normal out, Low-pass filter, or photocurrent detection blocks, including ADC.

In some examples, the peripheral system 420 also permits the processor 486 to control a spectral discriminator 460, e.g., a motor or other drive that operates a monochromator to select the particular wavelength band output by the monochromator.

In some examples, the peripheral system 420 permits the processor 486 to control a drive circuit 462. Drive circuit 462 can provide a bias voltage or other drive voltages, e.g., to operate detectors 402. Processor 486 and drive circuit 462 can control bias voltage in an open-loop manner, or in a closed-loop manner, e.g., using any of, or combination of any of, proportional (P), integral (I), and derivative (D) control, or other closed-loop control techniques. Bias voltage can be adjusted to maintain sensor readings within a range of the detectors 402.

Detectors 402 or peripheral system 420 may include one or more analog-to-digital converters (ADCs) or digital-to-analog converters (DACs). An ADC or DAC is limited in the analog signals it can input or output, respectively, by: the supply rails powering it, which sets the range it can accept or produce (signals will clip at the limits of the range); its bit depth, which sets the granularity of signals within that range it can detect or produce; and its speed, which determines how quickly it can provide a sample. Some ADCs/DACs (e.g., successive-approximation) permit trading off speed against bit depth (reduced speed for greater bit depth, or vice versa). In addition, some ADCs/DACs saturate and become nonlinear when accepting or producing signals within the supply rails but close to those rails (e.g., within 0.7 V of the rails). Passives and other components used in association with ADCs/DACs can also affect ADC/DAC performance.

Similar limitations apply to other electronic measurement devices and systems. For example, FPGAs configured to detect pulses have a maximum frequency of operation of their input latches or deserializers. If pulses arrive faster than that maximum frequency, not all pulses will be counted. In some examples herein, a measurement device (e.g., an ADC, or an ADC and related components) is associated with a predetermined range of levels (e.g., for a 5V ADC, 0.7 V-4.3 V; for a counter, 1 Gsps).

Accordingly, in some examples, the processor 486 operates drive circuit 462 to maintain analog signal levels at ADC inputs, counts at FPGA-based or other counters, or other outputs from photodetectors described herein (e.g., photodiode arrays, and similar) within the predetermined ranges. A processor, and ASIC, or an FPGA can measure the rate at which photons are being counted, and can analytically determine the derivative (or differential, finite difference, or other discrete approximation to the derivative) of the rate. If the rate exceeds a predetermined percentage of measured peak rate, or if the derivative indicates that the rate will soon exceed the predetermined percentage, the processor 486 can reduce the bias to reduce the number of photon pulses (e.g., by reducing the number of pulses that exceed a comparator threshold). Therefore, a feedback control system can be generated.

Still referring to Paper 10, p. 25, in some examples, the processor 486 can use the derivative to determine when to start and stop capturing data. For example, when a derivative that has been increasing reaches a maximum and begins to decrease, the processor can determine that a Gaussian particle-signal profile is at −1 standard deviation ($\sigma$), and can begin capturing. Other derivatives, e.g., higher-order derivatives, or zero-crossings of functions or derivatives, can be used to indicate timing for data capture. This can provide more consistency between the data captured for each particle.

In some examples, the peripheral system 420 permits the processor 486 to control a positioner 464, which can represent an x y shifter. Processor 486 can operate positioner 464 in an open-loop manner, or in a closed-loop manner, e.g., using any of, or combination of any of, proportional (P), integral (I), and derivative (D) control, or other closed-loop control techniques. Processor 486 can operate positioner 464 to maintain alignment of one or more illumination spots in a sensing volume. This can permit more accurately enabling individual spots (lasers) to measure particles flowing through a flow chamber.

The user interface system 430 can convey information in either direction, or in both directions, between a user 438 and the processor 486 or other components of system 401. The user interface system 430 can include a mouse, a keyboard, another computer (connected, e.g., via a network or a null-modem cable), or any device or combination of devices from which data is input to the processor 486. The user interface system 430 also can include a display device, a processor-accessible memory, or any device or combination of devices to which data is output by the processor 486. The user interface system 430 and the data storage system 440 can share a processor-accessible memory.

In various aspects, processor 486 includes or is connected to communication interface 415 that is coupled via network link 416 (shown in phantom) to network 450. For example, communication interface 415 can include an integrated services digital network (ISDN) terminal adapter or a modem to communicate data via a telephone line; a network interface to communicate data via a local-area network (LAN), e.g., an Ethernet LAN, or wide-area network (WAN); or a radio to communicate data via a wireless link, e.g., WIFI or GSM. Communication interface 415 sends and receives electrical, electromagnetic, or optical signals that carry digital or analog data streams representing various types of information across network link 416 to network 450. Network link 416 can be connected to network 450 via a switch, gateway, hub, router, or other networking device.

In various aspects, system 401 can communicate, e.g., via network 450, with a data processing system 404, which can include the same types of components as system 401 but is not required to be identical thereto. Systems 401 and 404 can be communicatively connected via the network 450. Each system 401, 404 can execute computer program instructions to operate measurement systems or capture measurements as described herein, or to communicate measurement data, e.g., via network 450.

Processor 486 can send messages and receive data, including program code, through network 450, network link 416, and communication interface 415. For example, a server can store requested code for an application program (e.g., a JAVA applet) on a tangible non-volatile computer-readable storage medium to which it is connected. The server can retrieve the code from the medium and transmit it through network 450 to communication interface 415. The received code can be executed by processor 486 as it is received, or stored in data storage system 440 for later execution.

Data storage system 440 can include or be communicatively connected with one or more processor-accessible memories configured or otherwise adapted to store information. The memories can be, e.g., within a chassis or as parts of a distributed system. The phrase "processor-accessible memory" is intended to include any data storage device to or from which processor 486 can transfer data (using appropriate components of peripheral system 420), whether volatile or nonvolatile; removable or fixed; electronic, magnetic, optical, chemical, mechanical, or otherwise. Example processor-accessible memories include but are not limited to registers, floppy disks, hard disks, tapes, bar codes, Compact Discs, DVDs, read-only memories (ROM), erasable programmable read-only memories (EPROM, EEPROM, or Flash), and random-access memories (RAMs). One of the processor-accessible memories in the data storage system 440 can be a tangible non-transitory computer-readable storage medium, i.e., a non-transitory device or article of manufacture that participates in storing instructions that can be provided to processor 486 for execution.

In an example, data storage system 440 includes code memory 441, e.g., a RAM, and disk 443, e.g., a tangible computer-readable rotational storage device or medium such as a hard drive. Computer program instructions are read into code memory 441 from disk 443. Processor 486 then executes one or more sequences of the computer program instructions loaded into code memory 441, as a result performing process steps described herein. In this way, processor 486 carries out a computer implemented process. For example, steps of methods described herein, blocks of the flowchart illustrations or block diagrams herein, and combinations of those, can be implemented by computer program instructions. Code memory 441 can also store data, or can store only code.

Furthermore, various aspects herein may be embodied as computer program products including computer readable program code ("program code") stored on a computer readable medium, e.g., a tangible non-transitory computer storage medium or a communication medium. A computer storage medium can include tangible storage units such as volatile memory, nonvolatile memory, or other persistent or auxiliary computer storage media, removable and non-removable computer storage media implemented in any method or technology for storage of information such as computer-readable instructions, data structures, program modules, or other data. A computer storage medium can be manufactured as is conventional for such articles, e.g., by pressing a CD-ROM or electronically writing data into a Flash memory. In contrast to computer storage media, communication media may embody computer-readable instructions, data structures, program modules, or other data in a modulated data signal, such as a carrier wave or other transmission mechanism. As defined herein, computer storage media do not include communication media. That is, computer storage media do not include communications media consisting solely of a modulated data signal, a carrier wave, or a propagated signal, per se.

The program code includes computer program instructions that can be loaded into processor 486 (and possibly also other processors), and that, when loaded into processor 486, cause functions, acts, or operational steps of various aspects herein to be performed by processor 486 (or other processor). Computer program code for carrying out operations for various aspects described herein may be written in any combination of one or more programming language(s), and can be loaded from disk 443 into code memory 441 for execution. The program code may execute, e.g., entirely on processor 486, partly on processor 486 and partly on a remote computer connected to network 450, or entirely on the remote computer.

Figure 14A:
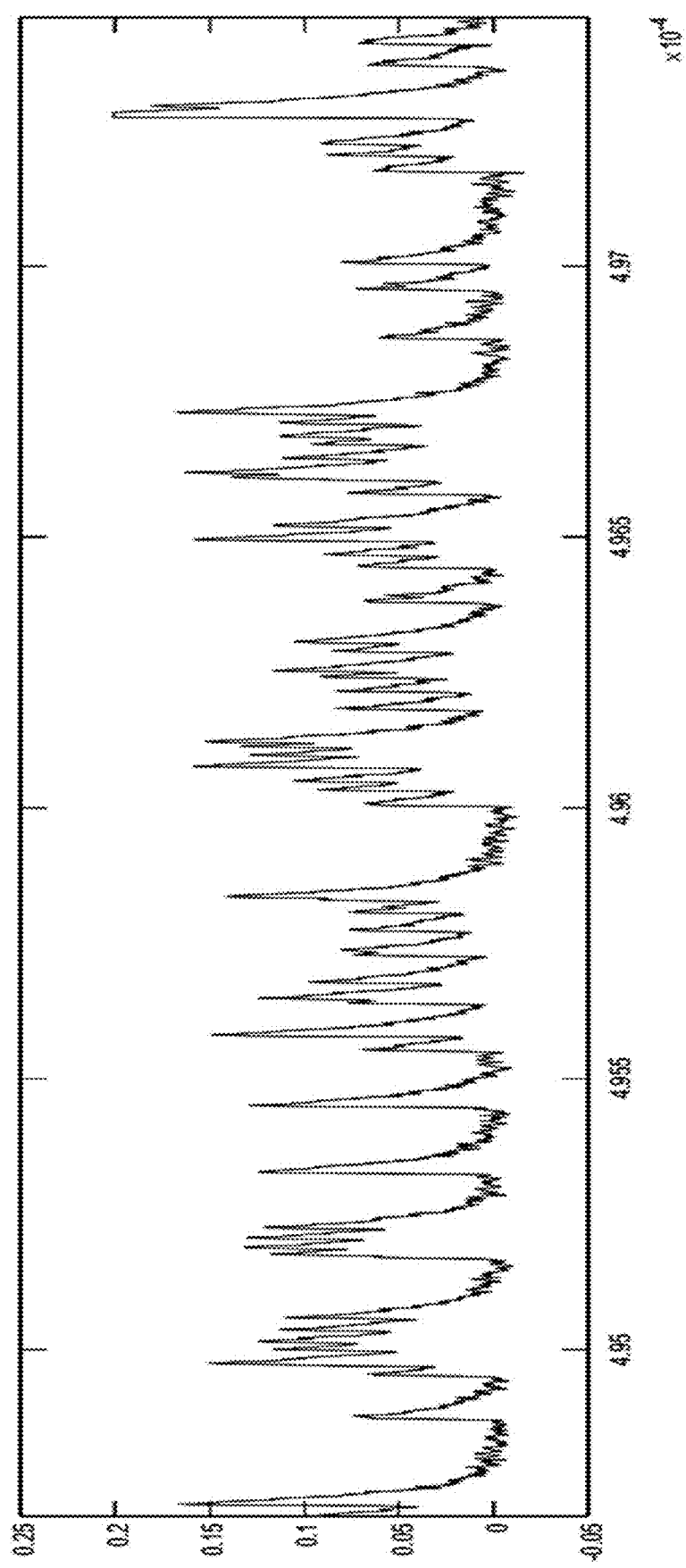
FIGS. 14a and 14b, are values of pixel out vs. time for low photon count rate and high photon count rate, respectively.
Figure 14B:
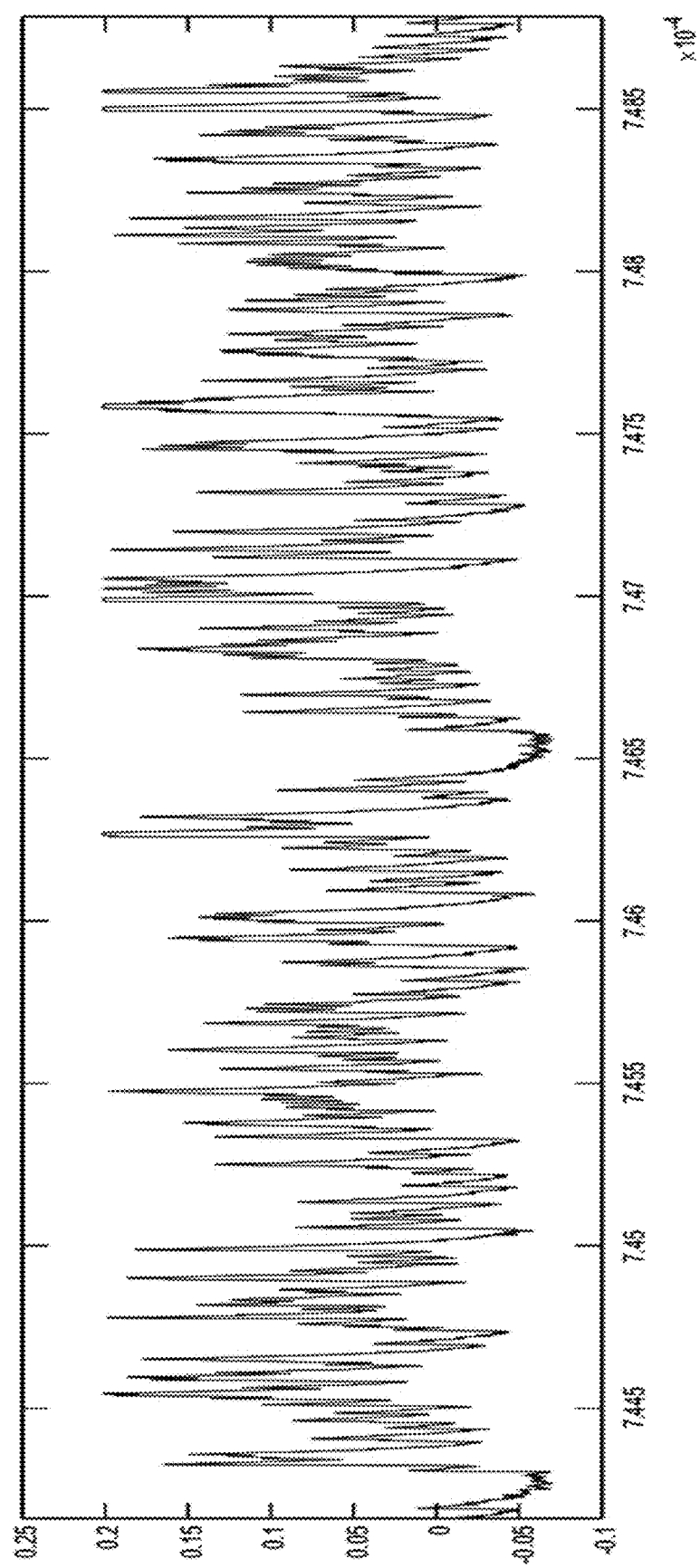
Figure 14C:
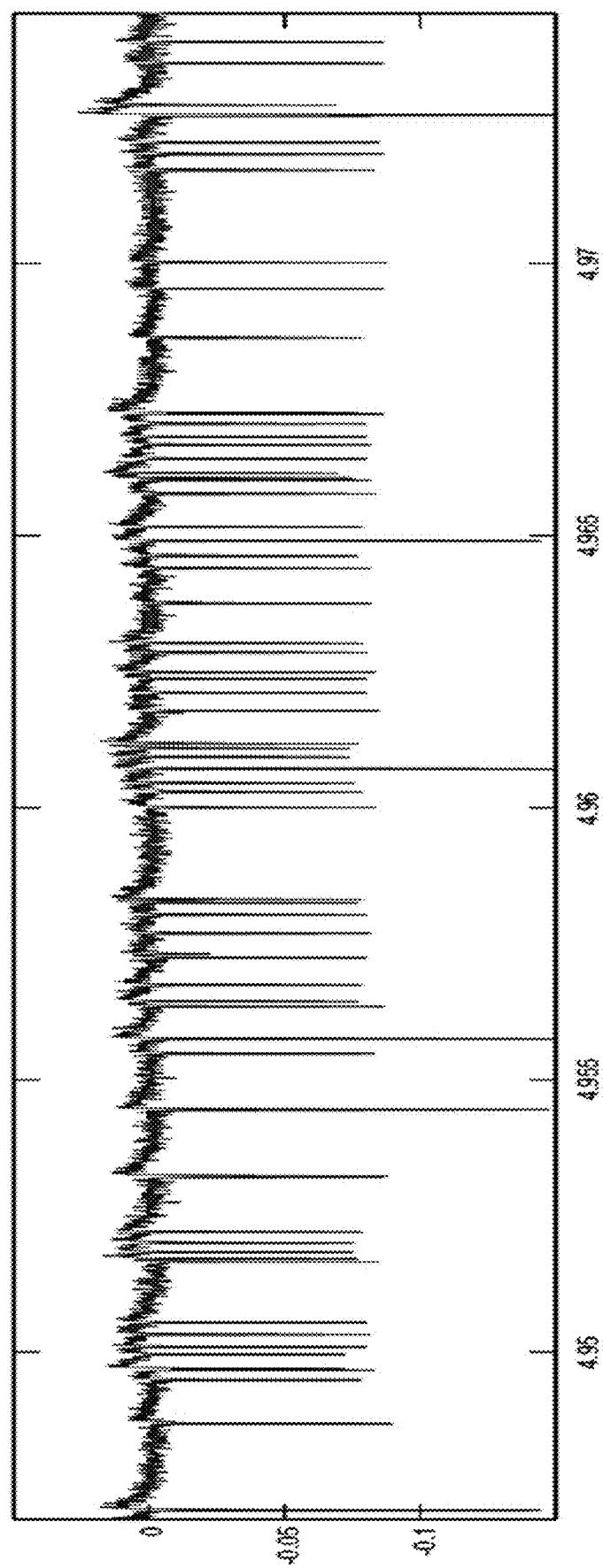
FIGS. 14c and 14d are values of differentiation out vs. time for low photon count rate and high photon count rate, respectively.
Figure 14D:
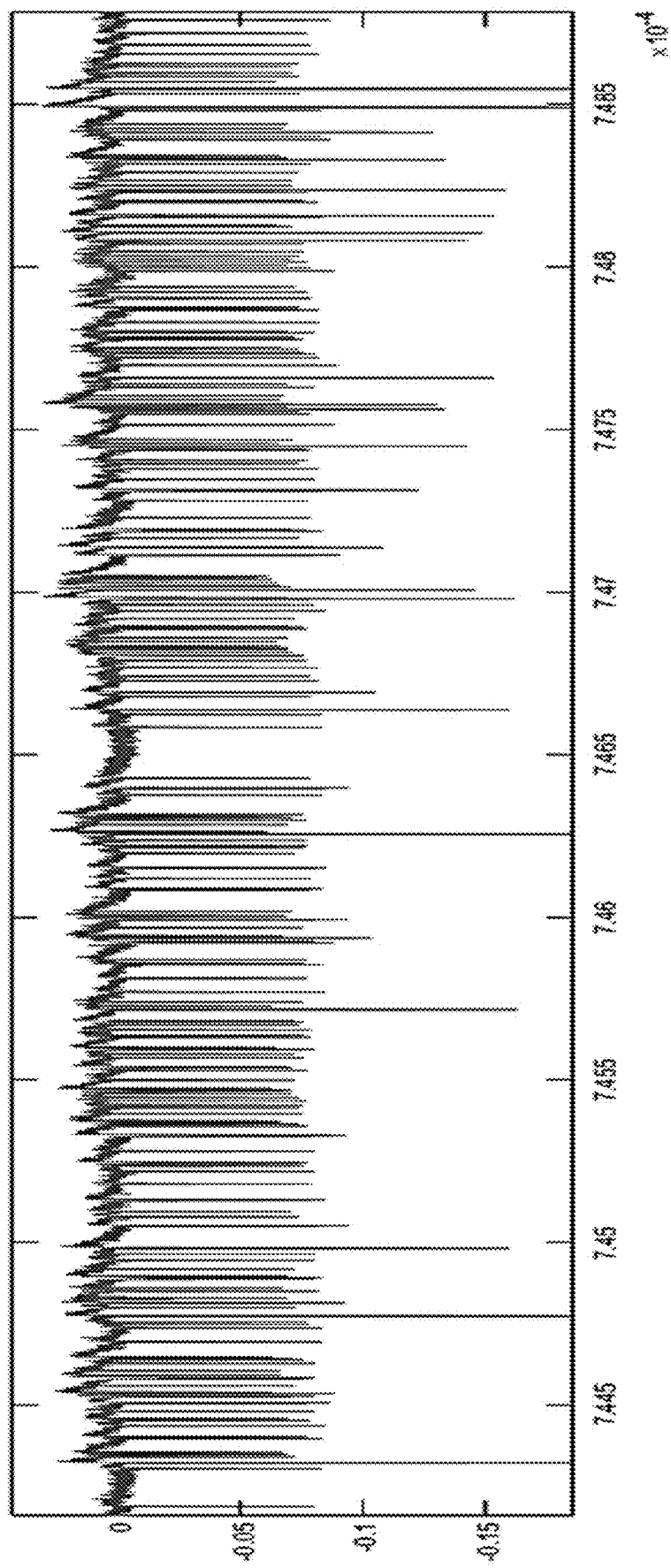
Figure 14E:
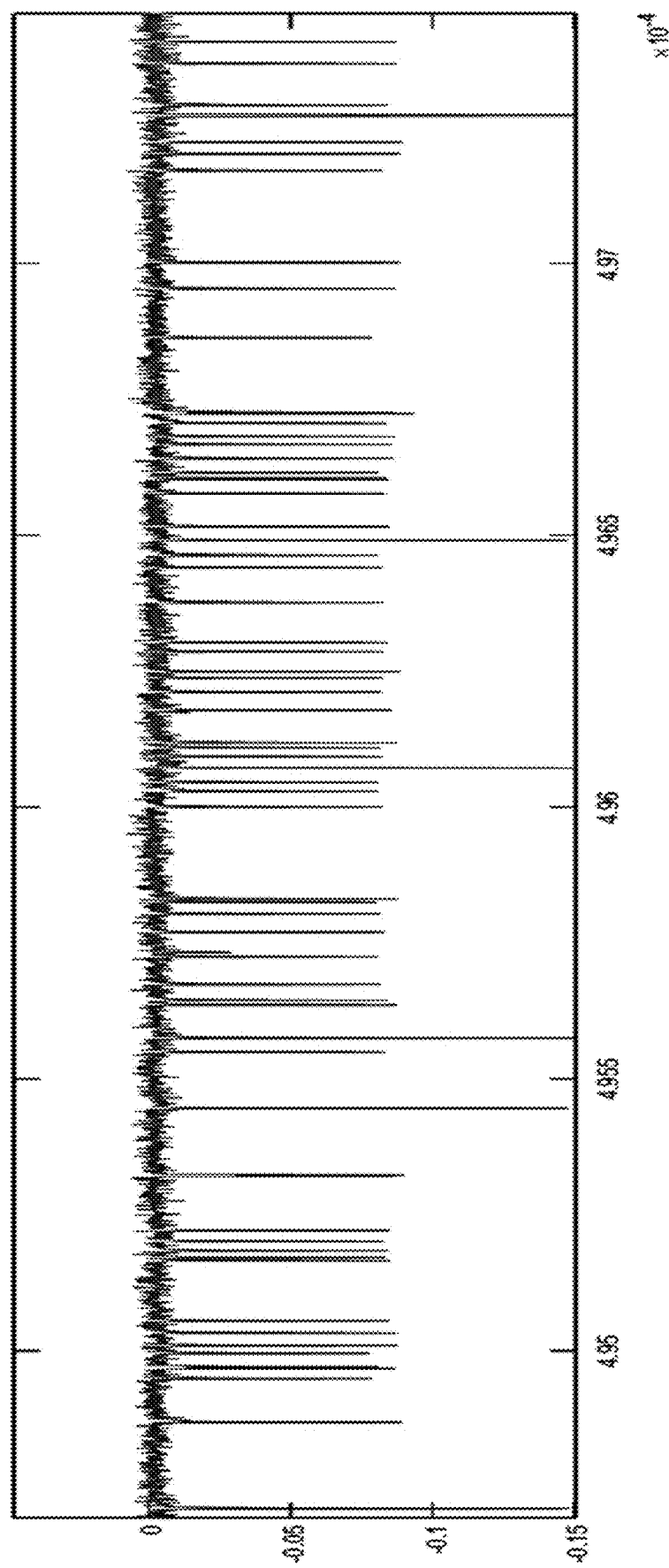
FIGS. 14e and 14f are values of adaptive pedestal clamp vs. time for low photon count rate and high photon count rate, respectively.
Figure 14F:
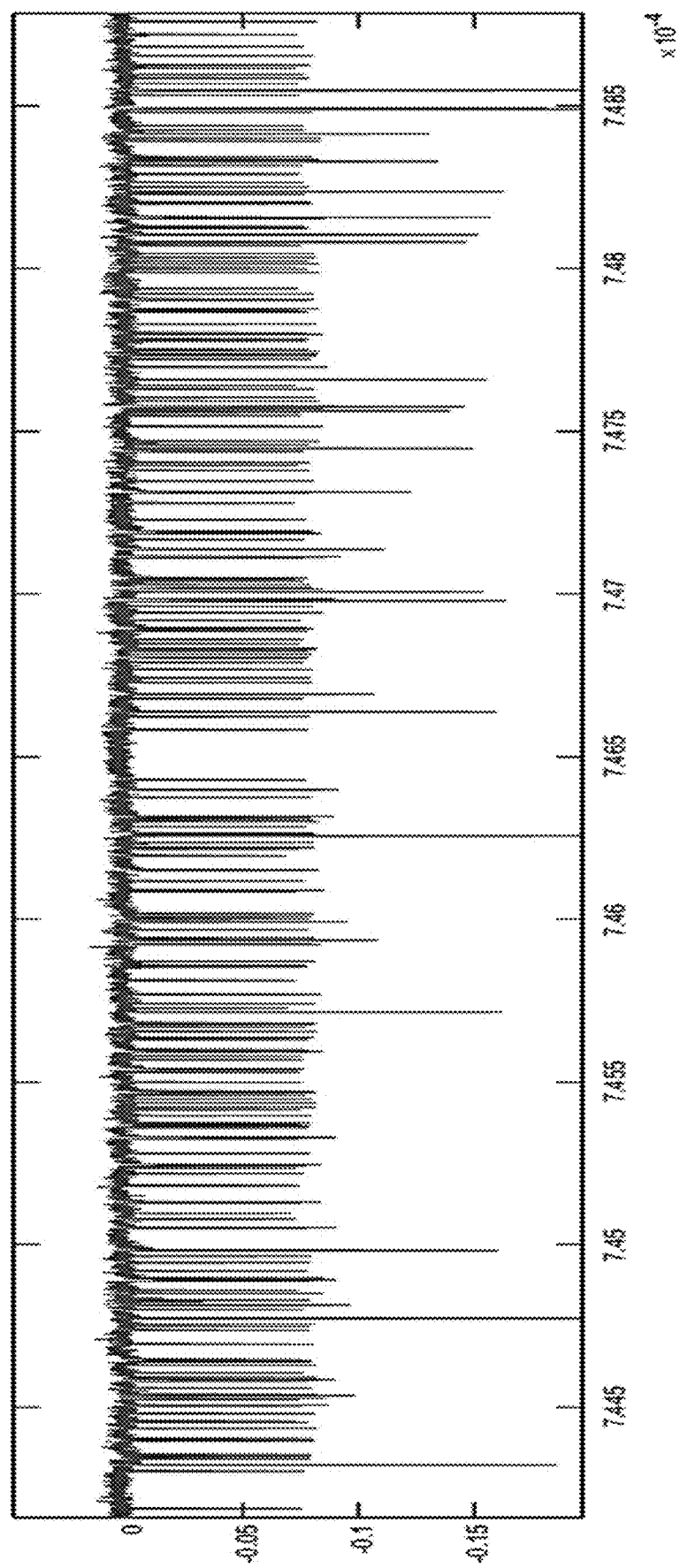
Figure 15:
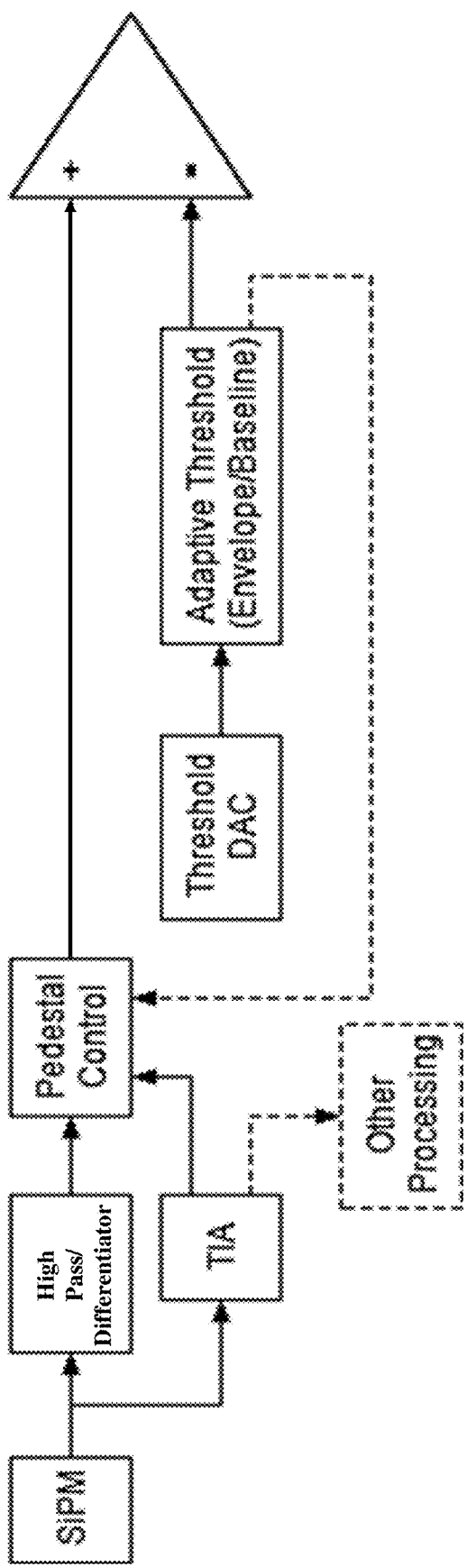
FIG. 15 is a block diagram of a signal shaping sub-system according to the present disclosure.

The full block diagram for the components used in various embodiments is shown in FIG. 15, described further below. Each of these components is first described with reference to FIGS. 5a-5c, 6a-6b, 7a-7b, 8, 9a-9c, 10a-10c, 11a-11b, 12a-12b, 13a-13b, 14a-14f, and 15a-15b, each of which is described in detail below.

Figure 5B:
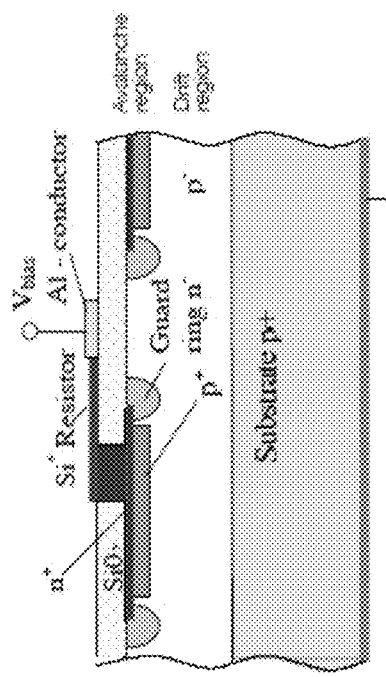
FIG. 5b is a cross sectional area of the pn device showing the avalanche region.
Figure 5A:
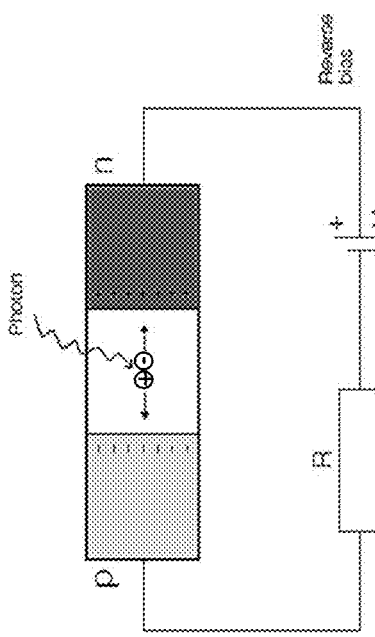
FIG. 5a is a schematic of a pn silicon device adapted to generate an electron-hole pair when receiving incident light.
Figure 5C:
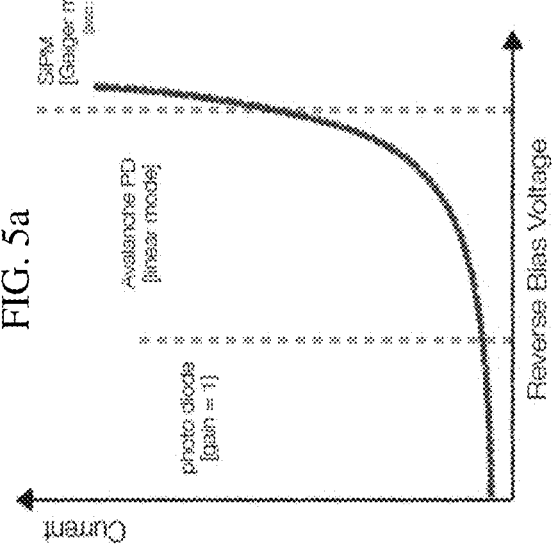
FIG. 5c is a graph of current vs. reverse bias voltage showing three modes: photodiode mode, avalanche photodiode mode, and the Geiger mode in which mode the silicon photomultipliers (SiPM) is preferably operating.

As discussed above, several types of optical detectors can be used with the systems described in the present disclosure. These include photodiodes, photomultiplier tubes, SiPM, Geiger-mode photodiodes, and other types of light sensitive sensors known to a person having ordinary skill in the art. Referring to FIGS. 5a-5c operations of an example SiPM is described. FIG. 5a is a schematic of a pn silicon device adapted to generate an electron-hole pair when receiving incident light. The pn device is coupled to a voltage source for biasing and a resistor R. In the Geiger region of operation, the bias voltage is sufficiently high in magnitude that, when a photon strikes the sensor and releases a photoelectron, that electron can strike other atoms and release additional electrons. Accordingly, a single photon can trigger a cascade of electrons that causes the SiPM to become conductive and produce a detectable current sensed at R. FIG. 5b shows a cross sectional area of the pn device showing the avalanche region. Thus when incident photon strikes the pn device, electrons are generated according to the Geiger mode which is extremely fast on the order of 10 ps. FIG. 5c is a graph of current vs. reverse bias voltage showing three modes: photodiode mode, avalanche photodiode mode, and the Geiger mode in which mode the SiPM is preferably operating.

Figure 6B:
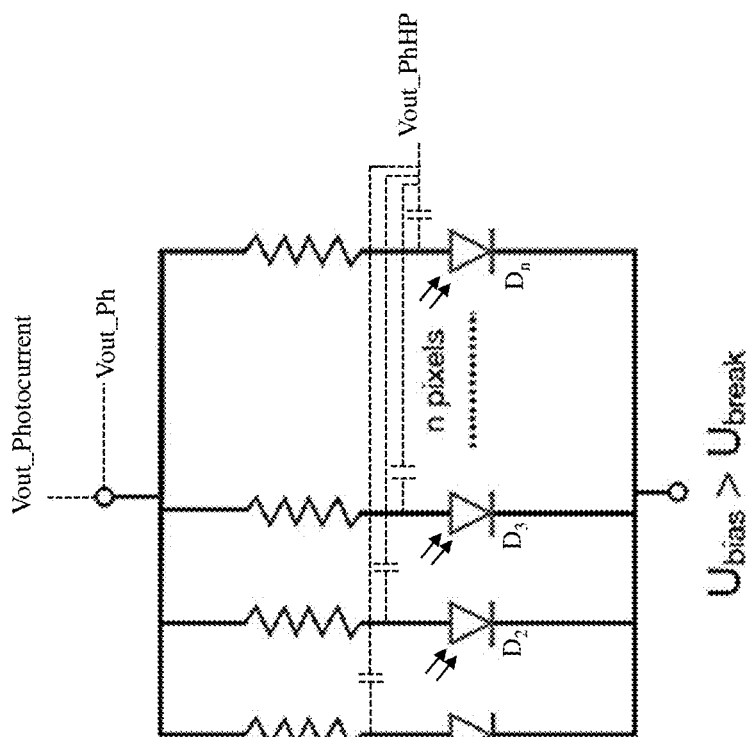
FIG. 6b is a sample schematic showing how the Geiger avalanche photodiode (APD) and quench resistors are connected to each other in the array.
Figure 6A:
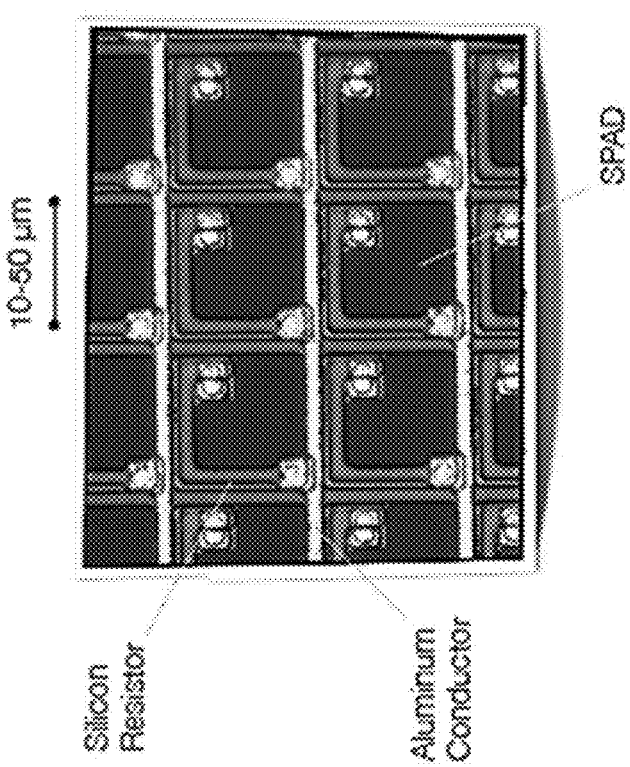
FIG. 6a is an SiPM array, according to the present disclosure.

FIG. 6a shows example configurations of an SiPM array 600. As shown, a sensor can include rows and columns of sensor elements (i.e., pn devices, see FIG. 5b). Each sensor element can include a quench resistor in series with a Geiger-mode avalanche photodiode (APD), e.g., a SiPM as shown in FIG. 5b. The sensor elements can be electrically in parallel across a row, column, or 2 D sensor array. As current flows through the APD in response to impact of a photon thereon, voltage across the quench resistor increases. Therefore, voltage across the APD decreases. When the voltage across the APD drops below the Geiger threshold because of the quenching resistor, the APD will cease to conduct and will be ready to detect another photon. This process is referred to as "quenching." FIG. 6b is a sample schematic showing how the Geiger APD and quench resistors are connected to each other in the array 600. Each Geiger-mode avalanche photodiode is coupled to a quench resistor with a differential output to be read with downstream circuitry. The common terminals of the Geiger APDs is coupled to a biasing circuit that biases the diodes above the breakdown voltage of each diode. The common terminal of the quench resistors is resistively coupled to ground providing a single-ended output that can also be read as a reference, as will be described in further detail below. Three optional outputs are shown: Vout_Photocurrent, Vout_PhHP, and Vout_Ph. The Vout_Photocurrent provides the capability to simultaneously measure the photocurrent as well as the individual photons. Vout_PhHP is the output according to one style of the array in which the output of the APDs pass through a high-pass filter prior to being further processed. Vout_Ph is the output of the array without high-pass filtering.

An arrayed pixel Si Photomultiplier (Geiger mode) such as that illustrated in FIG. 6a can provide a high gain (e.g., $>10^6$) and high sensitivity of photon detection. Such sensors can be relatively compact and can operate with relatively low bias voltages, e.g., <25-70 V. Such sensors can be durable under light exposure and can be relatively insensitive to magnetic fields. However, some prior schemes have a limited dynamic range due to the limited number of pixels on the detectors and the dead time during quenching, during which those prior sensors do not detect photons. Moreover, some prior sensors have relatively high dark count rates (i.e., appreciable output signal even when no light is incident) or can be sensitive to temperature variations.

Figures 7A, 7B:
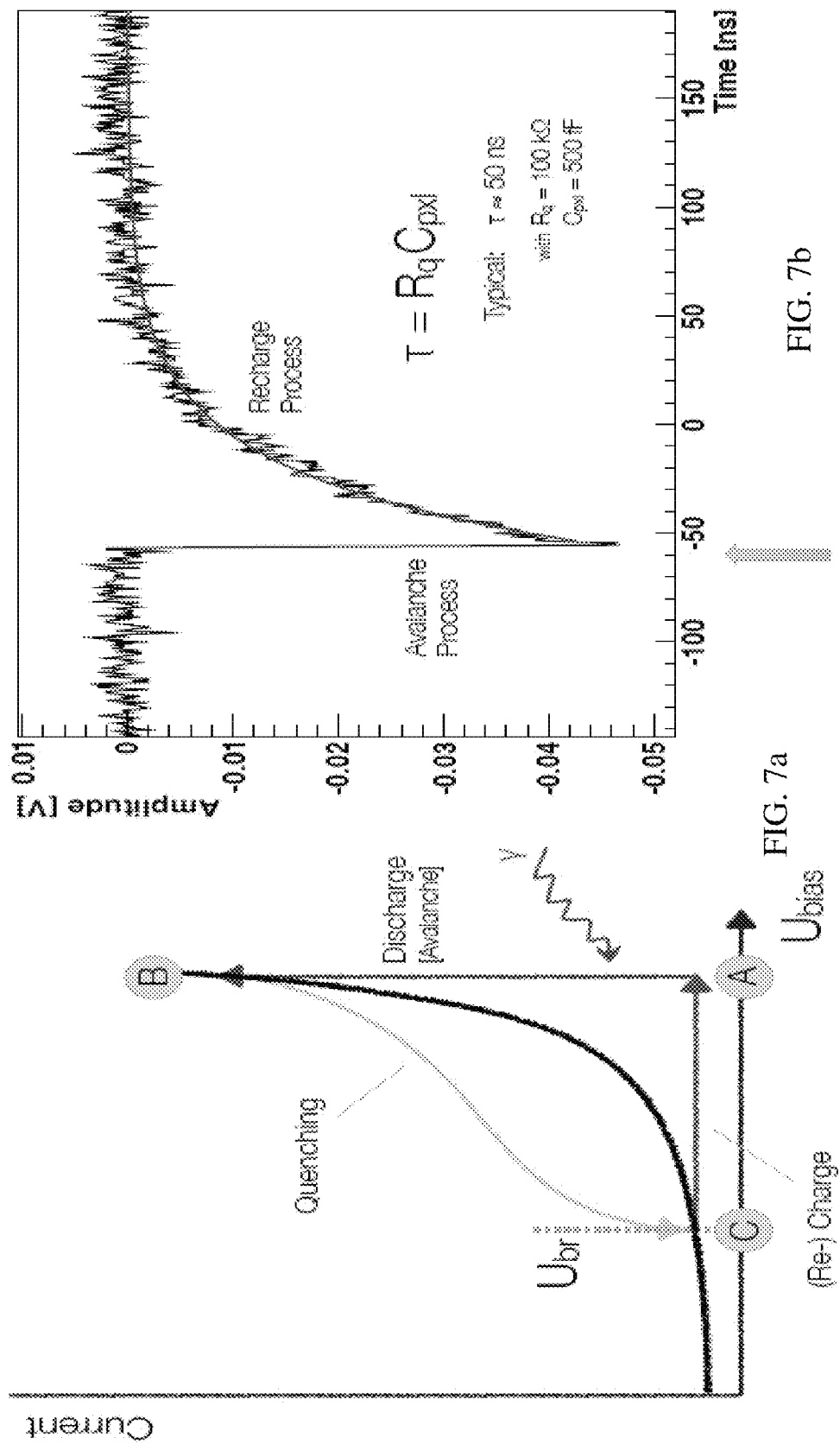
FIGS. 7a and 7b are graphs of current vs. bias and voltage vs. time, respectively, which show examples of the SiPM behavior during an avalanche and quenching process.
Figure 8:
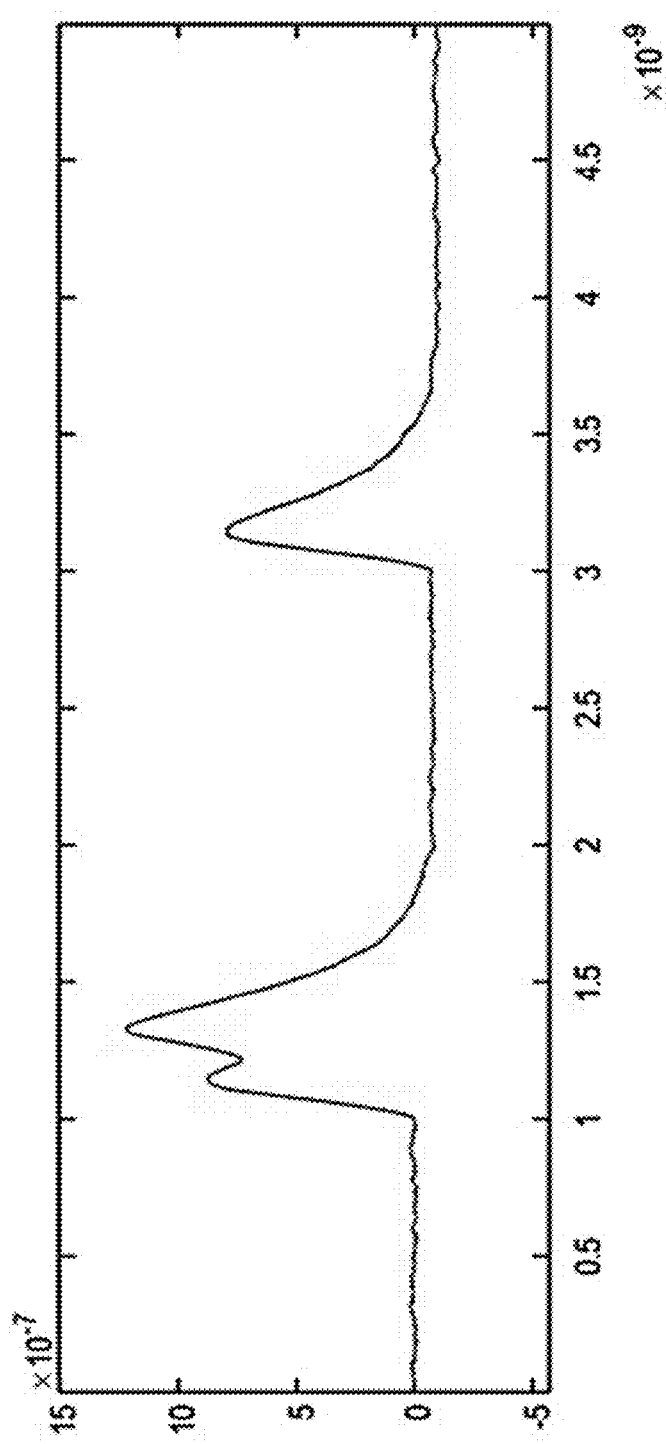
FIG. 8 is a graph of detector output vs. time, providing the raw data which shows two photon events on the double peak around 1.5 ns, and a single photon peak near 3 ns.

FIGS. 7a and 7b which are graphs of current vs. bias and voltage vs. time, respectively, show examples of the SiPM behavior during an avalanche and quenching process. As discussed above, the avalanche process is very fast, e.g., on the order of picoseconds (e.g., 10 ps-100 ps). However, the quenching ("recharge" or "dead time") process is comparatively slow, e.g., on the order of nanoseconds (e.g., 50 ns-100 ns). As noted above, during some prior schemes, the sensor does not detect photons during the recharge process. Accordingly, some prior sensors only provide a dynamic range of about three orders of magnitude. This inability poses a serious challenge when designing a system that can simultaneously measure photocurrent as well as single-photon detection, as there may be multiple photons incident during one full cycle (i.e., avalanche-recharge/quenching). Referring to FIG. 8 which is a graph of detector output vs. time, the raw signal is shown which shows two photon events on the double peak around 1.5 ns, while a single photon peak near 3 ns. The challenge with the first double photon event is that the second photon arrived prior to the completion of the quenching phase of the first photon. As a result, there is uncertainty as to how to measure the waveform.

Figure 9A:
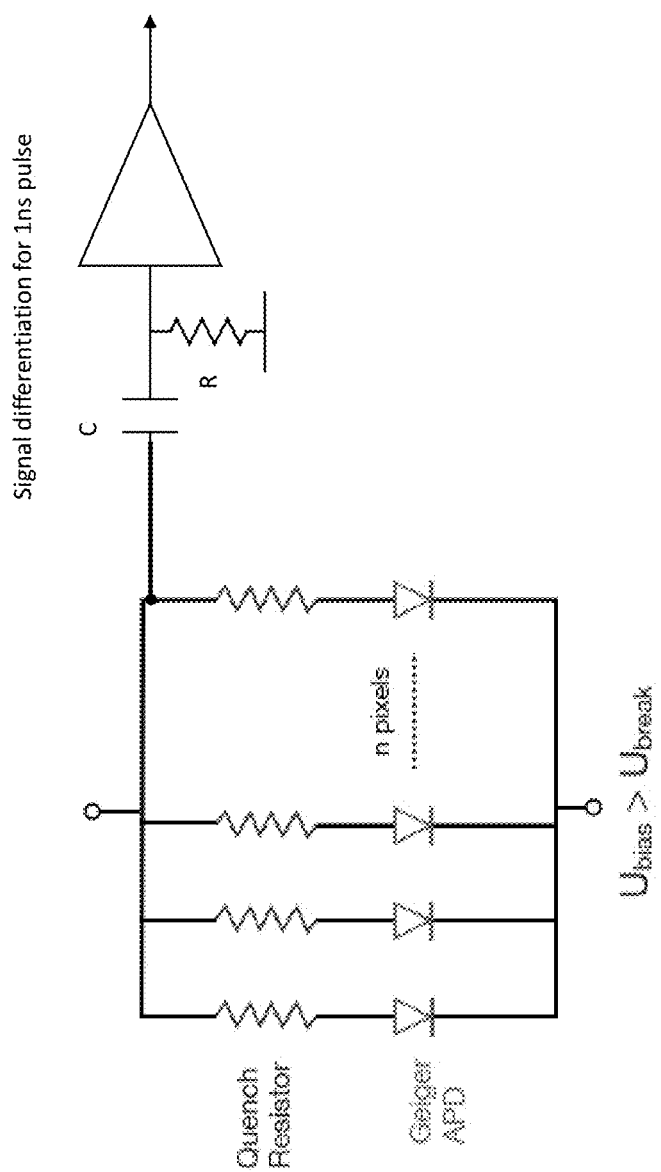
FIG. 9a is a circuit diagram, for demonstration purposes, which shows use of a differentiator to provide 1 ns photon pulses.
Figure 9B:
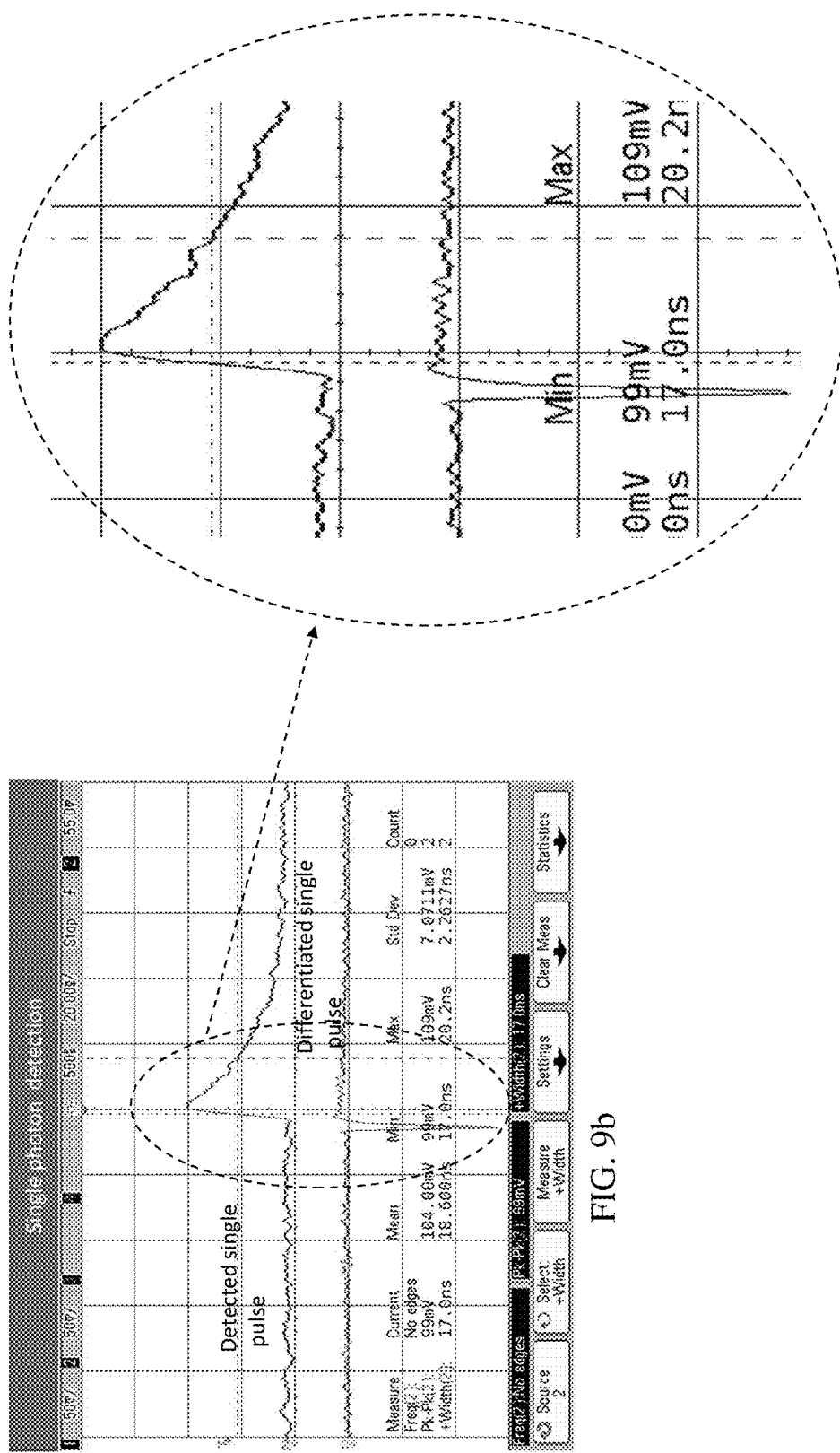
FIG. 9b is an example of a single photon events with an enlarged view of the differentiated signal as compared to the raw data at the moment of the avalanche event.
Figure 9C:
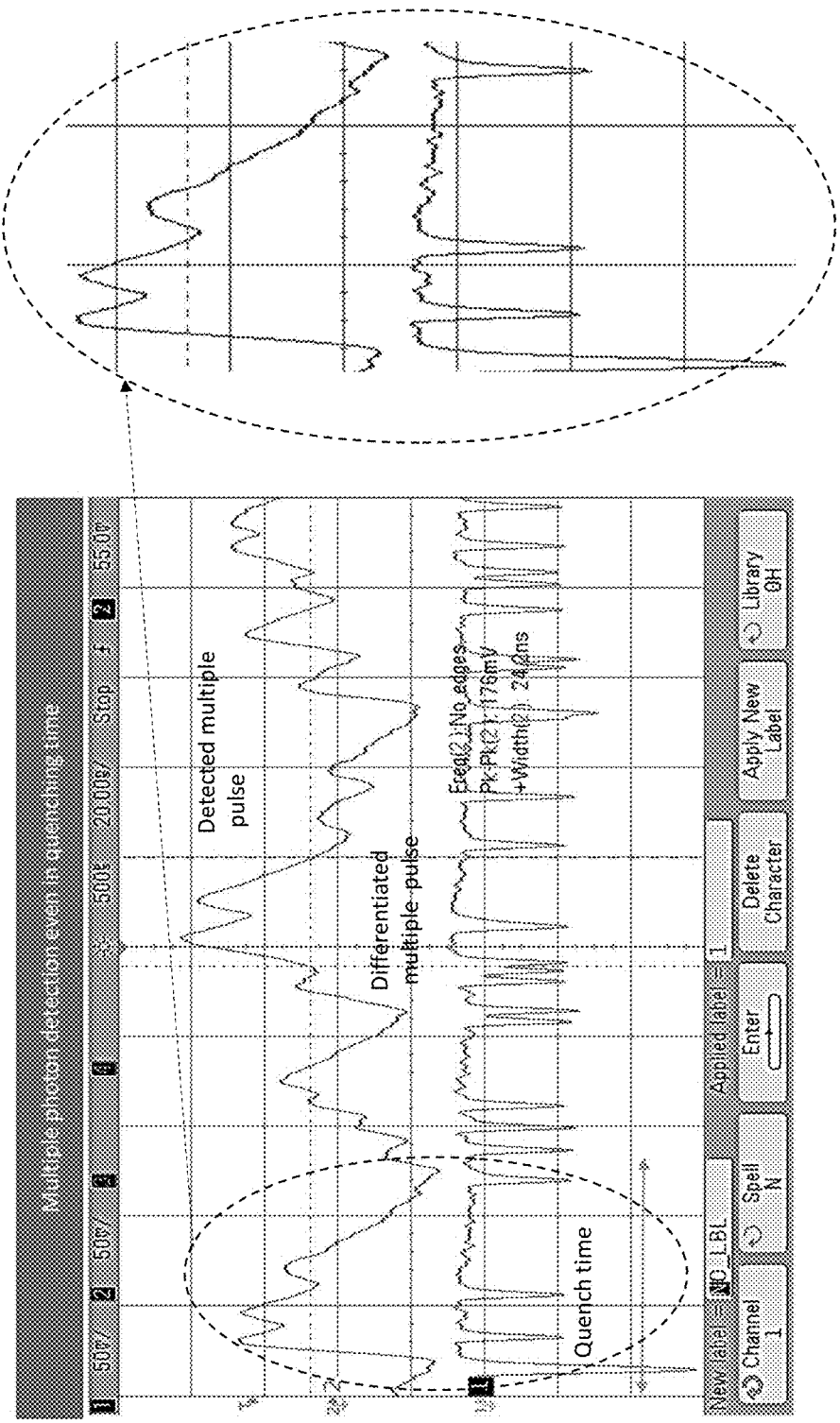
FIG. 9c is an example of a multiple photon events with an enlarged view of the differentiated signal as compared to the raw data at the moment of the avalanche events during the same quenching period.

One approach to overcome this challenge, according to the present disclosure, is to differentiate the raw signal. Referring to FIG. 9a, for demonstration purposes, a circuit diagram is shown using a differentiator to provide 1 ns photon pulses. This circuit can provide detection of multiple photons using a single pixel, which can in turn increase dynamic range. The output of the detector is provided to the differentiator thereby causing a differentiation of the detected signal. Referring to FIGS. 9b and 9c two examples of the differentiation is shown. FIG. 9b provides an example of a single photon events with an enlarged view of the differentiated signal as compared to the raw data at the moment of the avalanche event. Conversely, FIG. 9c provides an example of a multiple photon events with an enlarged view of the differentiated signal as compared to the raw data at the moment of the avalanche events during the same quenching period. As shown in both FIGS. 9b and 9c, the differentiated signals show pulses even when a photon strikes the detector during the dead time (i.e., during the quenching period). Although the differentiator is shown as being coupled to the anode side of the APDs, it can additionally or alternatively be coupled to the cathode side of the APDs.

The number of photons is dependent on the power of the light source 208 (see FIG. 2). A positive correlation between power and photons exists.

Signal processing of the differentiation signal can distinguish photons within overlapped photon pulses. Consequently, a more accurate photon counting can be achieved owing to counting of photons that would otherwise be missed during an APD's dead time. Additionally, a fast detection allows rapid measurements of the lifetime of fluorescent molecules, something that is not possible with current state of the art flow cytometers.

Figure 10A:
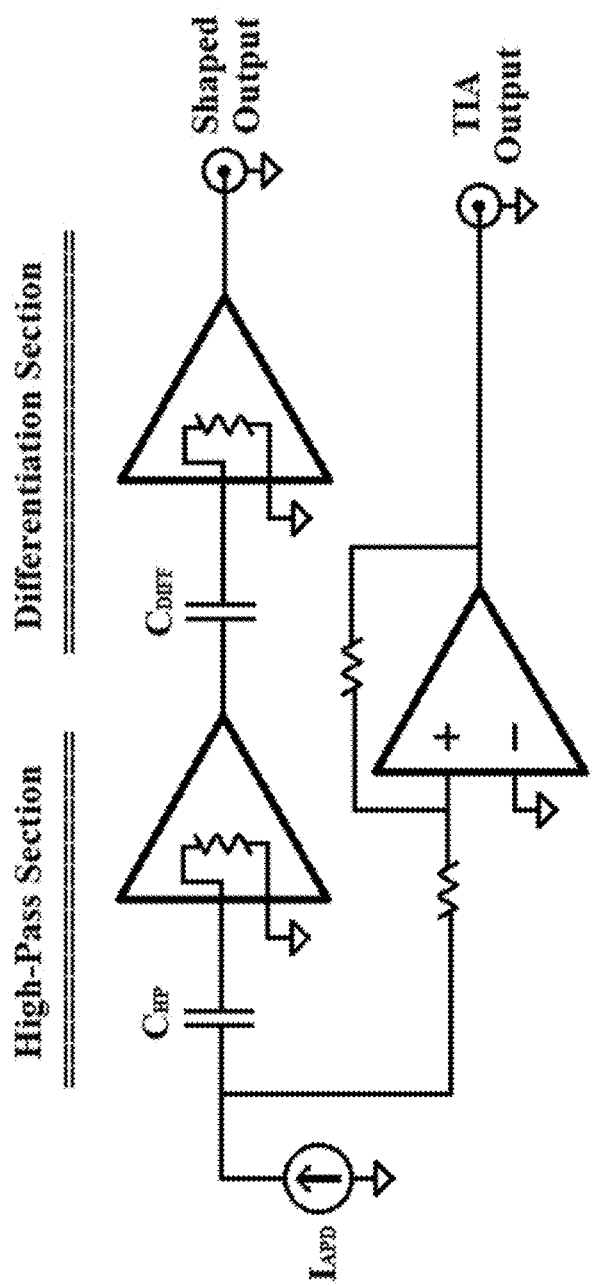
FIG. 10a is an example differentiation circuit with a high pass section and a differentiation section.

Referring to FIG. 10a according to various embodiments, an example differentiation circuit is shown with a high pass section and a differentiation section. The values of the components illustrated in FIG. 10a can be adjusted, e.g., to provide differentiation signal processing with a rise time $T_{rise}$ corresponding to the timescale of the avalanche process with respect to a particular SiPM, e.g., 10 ps-100 ps. In the illustrated circuit of FIG. 10a, an ideal square pulse produces a Gaussian pulse after the high pass filter. Circuit parameters of the differentiation section can be adjusted to provide separation of two partially-overlapping Gaussian pulses. According to various embodiments, example circuit parameters include:

High-pass filter: $C_{HP}$ (Farad)=$T_{RISE}$/50
Differentiation filter: $C_{DIFF}$ (Farad)=(1/5)CHP=$T_{RISE}$/250
Primary corner frequency: F0 (Hz)=1/(10 $T_{RISE}$)
$T_{RISE}$: avalanche process time; typical<100 ps In FIG. 10a, there is also a transimpedance amplifier circuit to be used by a pedestal control circuit discussed below. The output of the transimpedance amplifier is a voltage representation of the current provided by the APD. When the signal is passed through the high pass filter, because of AC coupling, the signal attains a pedestal. This happens specially when there are large number of photons affecting pulse widths and frequency of photon events. Thereafter a pedestal control circuit is used to remove the deviation caused by the pedestal. The output of the transimpedance amplifier is an enablement for the pedestal control circuit, as discussed below.

Figure 10B:
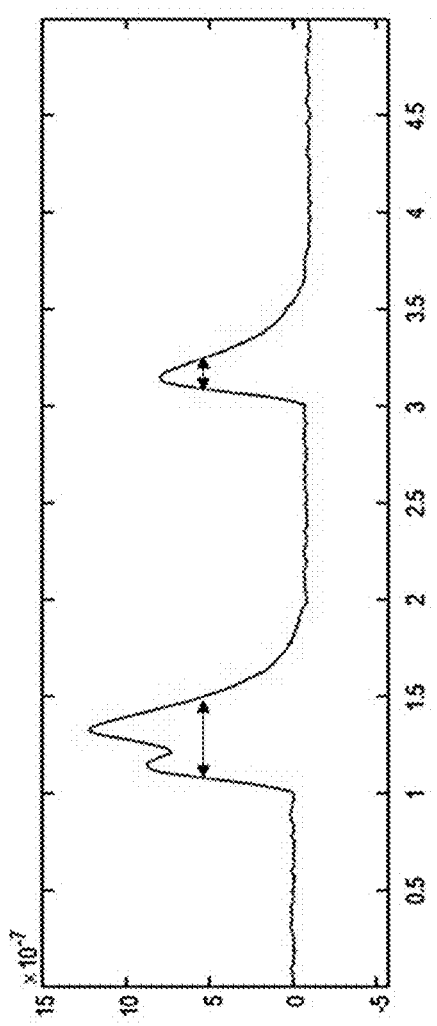
FIGS. 10b and 10c are example graphs showing results of the circuit shown in FIG. 10a, where in FIG. 10b an example input to the differentiation stage of the circuit is shown
Figure 10C:
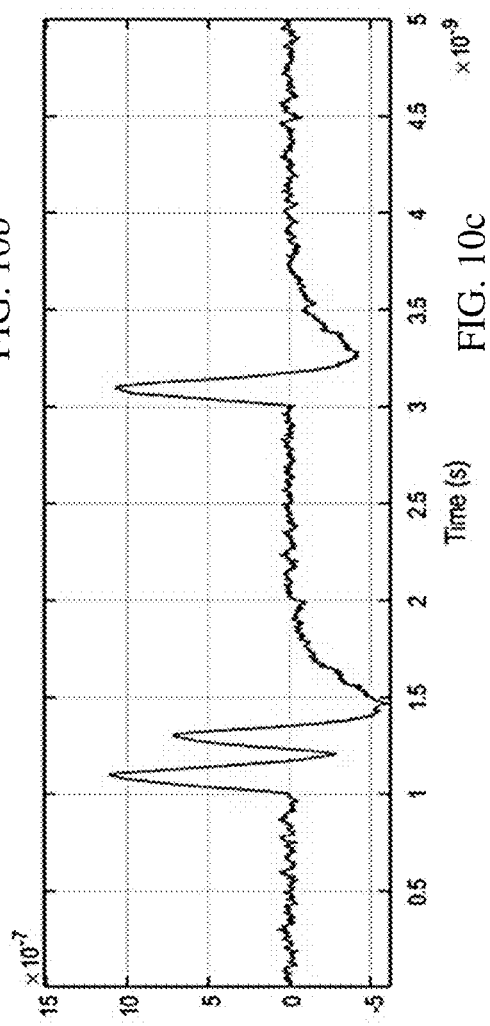

Referring to FIGS. 10b and 10c, example results of the circuit shown in FIG. 10a are shown. In particular, FIG. 10b shows an example input to the differentiation stage of the circuit and FIG. 10c shows an example output from that circuit. As shown, the differentiation stage responds to two overlapping pulses, e.g., triggered by two separate photons, by providing a signal having two zero-crossings (FIG. 10c). Other thresholds than zero can additionally or alternatively be used. As indicated by the double-ended arrows in the top plot, a multiple-photon pulse can have a wider pulse width (longer duration) than a single-photon pulse. Accordingly, a pulse width differential can be used to discriminate closely overlapped 1-photon pulses from 2 photon pulses. One or more comparator/counter circuits can be used to sense the zero crossings and count pulses.

Figure 11A:
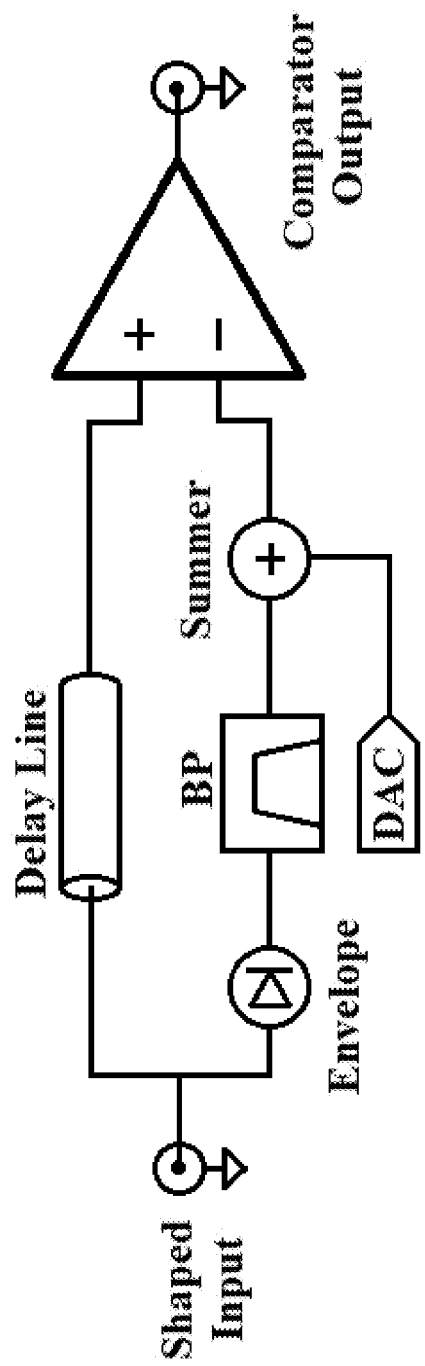
FIG. 11a is an adaptive threshold circuit.
Figure 11B:
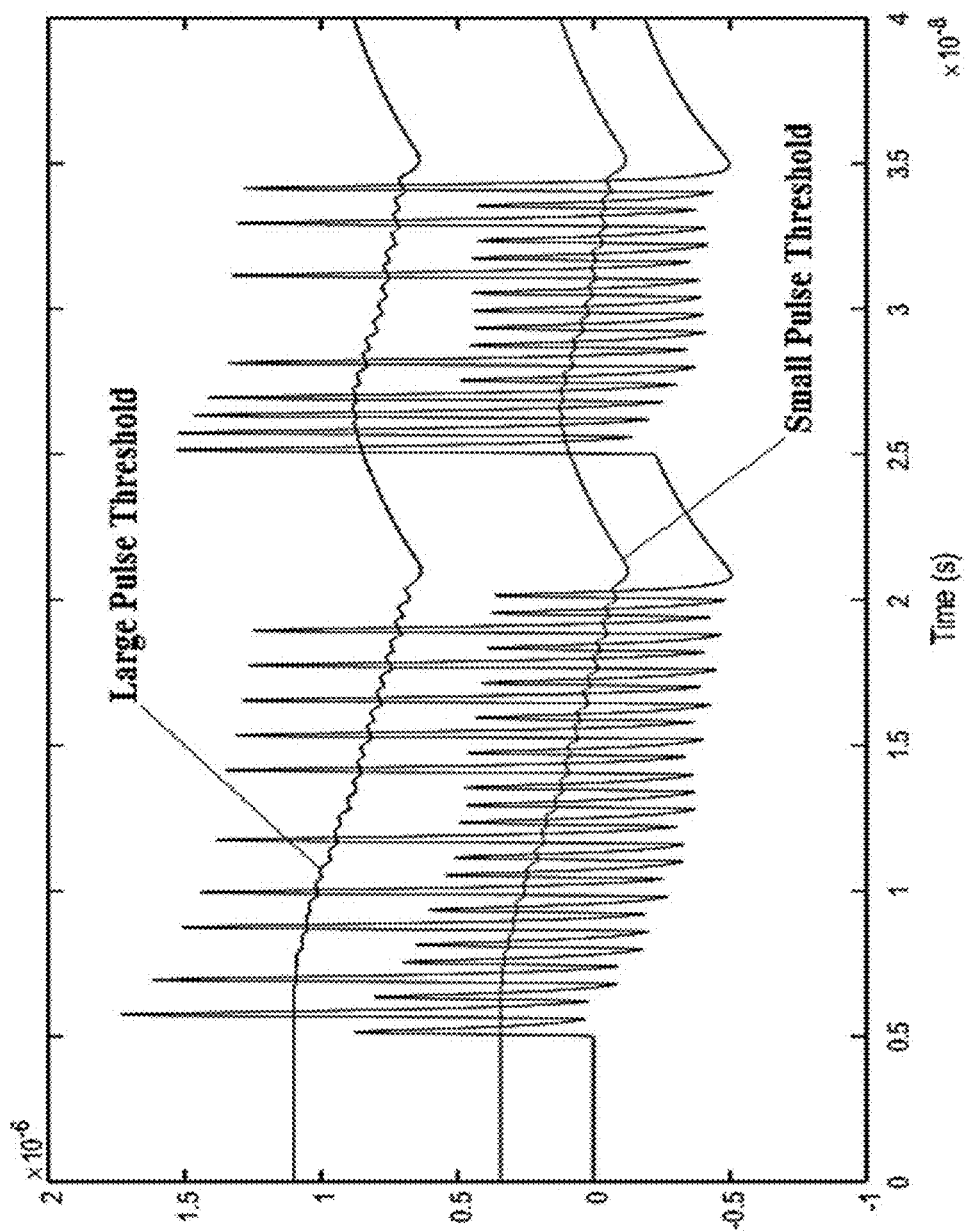

The waveform shown in FIG. 10c can be prone to AC-coupling of outputs from the differentiator section, thereby large excursions of the signal baseline can occur among rapid successive pulses. To reduce miscounts, according to various embodiments, an adaptive threshold level(s) is needed by tracking the signal baseline. An RF envelope detector, e.g., monolithic or made from discrete components, can produce a signal that closely follows peak excursions of the input. A filter can then further smooth the signal. A constant offset can also be added to the envelope to produce the tracking threshold level(s). The pulse is delayed, e.g., through at least one of a long transmission line or a passive network, so that the pulse arrives to the comparator at the same time as the moving threshold(s). Such an adaptive threshold circuit is shown in FIG. 11a, with its output shown in FIG. 11b. Two thresholds are illustrated: a large-pulse threshold and a small-pulse threshold. In some examples, the small-pulse threshold is used to detect single-photon excitation (1PE) pulses and the large-pulse threshold is used to detect double-photon excitation (2PE) pulses. A 2PE pulse can result from near-simultaneous absorption of two photons, or from absorption of a single photon of a shorter wavelength.

Figure 11C:
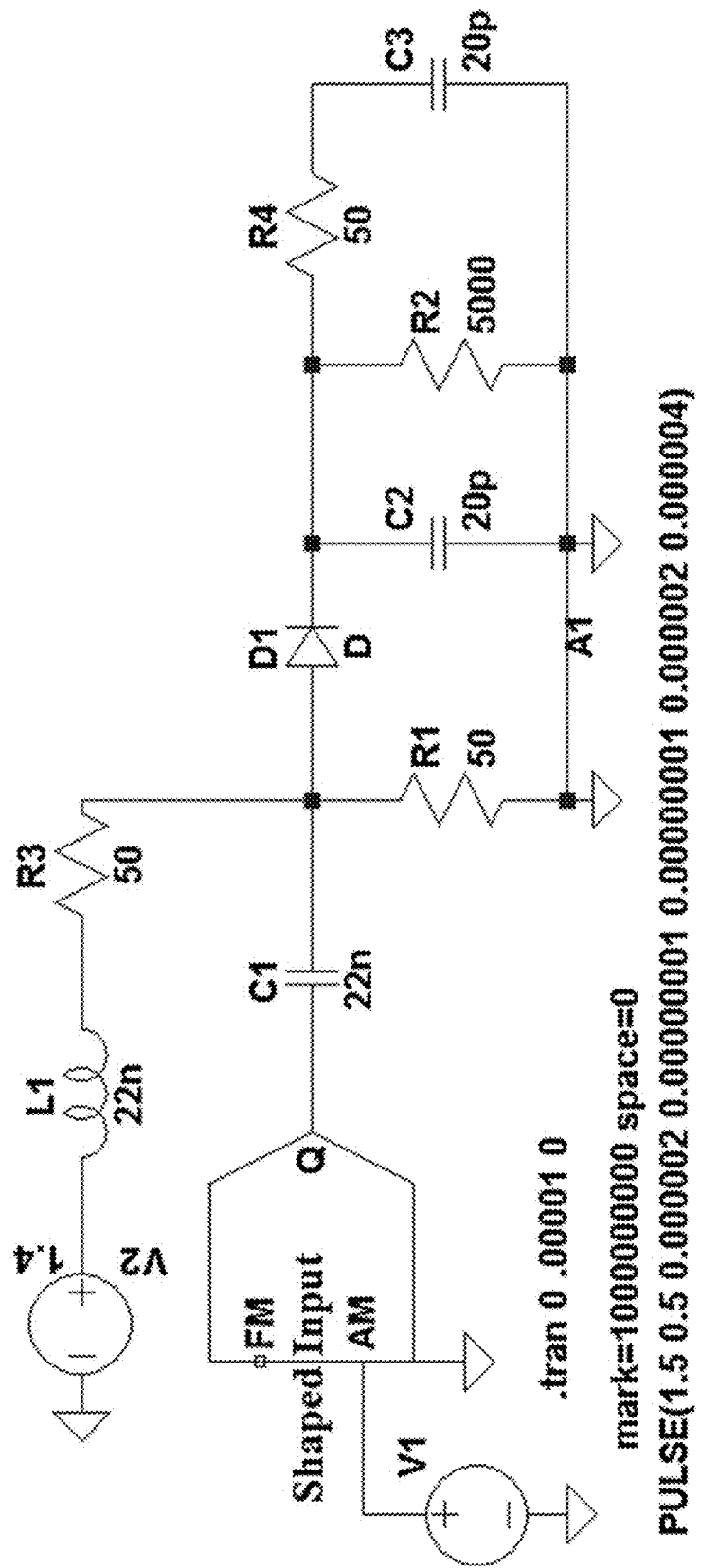
Figure 11D:
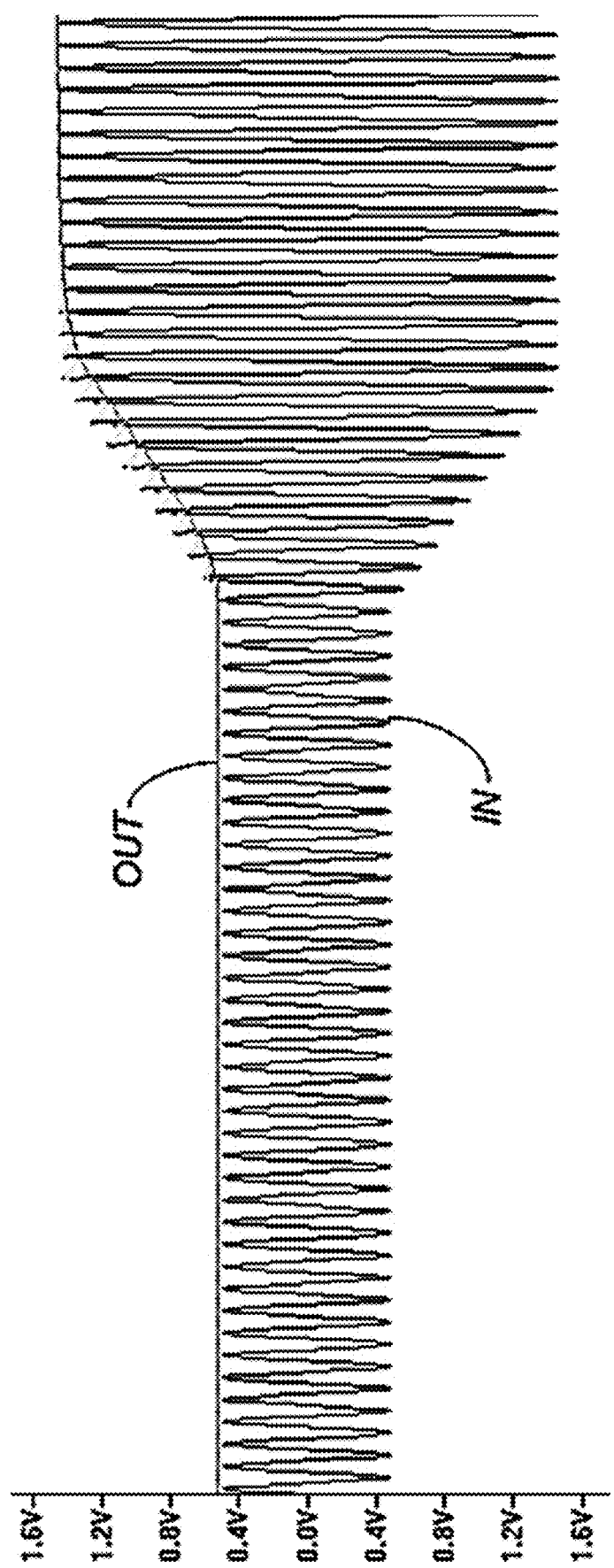
FIG. 11d is an example output of the circuit shown in FIG. 11c.

Referring to FIG. 11c, a circuit of an example filter section in an envelope-detector circuit is shown. Output of the circuit of FIG. 11c is shown in FIG. 11d. The illustrated filter section can be used, e.g., in the adaptive threshold circuit of FIG. 11a. In some example envelope detectors, the diode is specified for GHz operation with junction capacitance, e.g., about 1 pF-about 10 pF. Some example envelope detectors include a transimpedance amplifier (TIA).

Figure 12A:
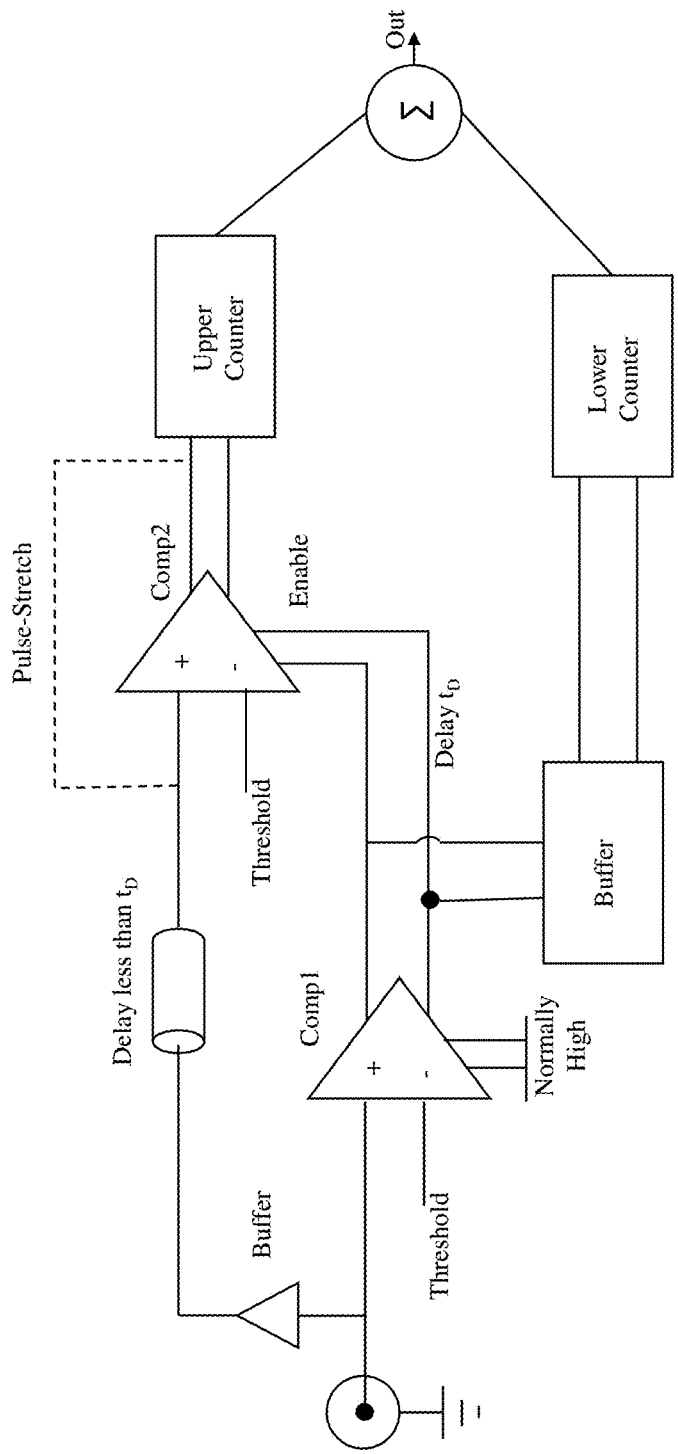
FIG. 12a is a circuit according to the present disclosure that can then be used to count pulse-widths and be used as a discriminator.

Having developed the adaptive thresholds, the circuit shown in FIG. 12a can then be used to count pulse-widths and be used as a discriminator, according to various embodiments. This circuit is alternatively used as compared to the photon pipeline discussed later. It should be appreciated that a photon even requires timing resolution in the ps range, therefore, comparators and counters capable of that kind of resolution while may be available are excessively costly. Therefore, the implementation shown in FIG. 12a is provided as an alternative embodiment only.

Figure 12B:
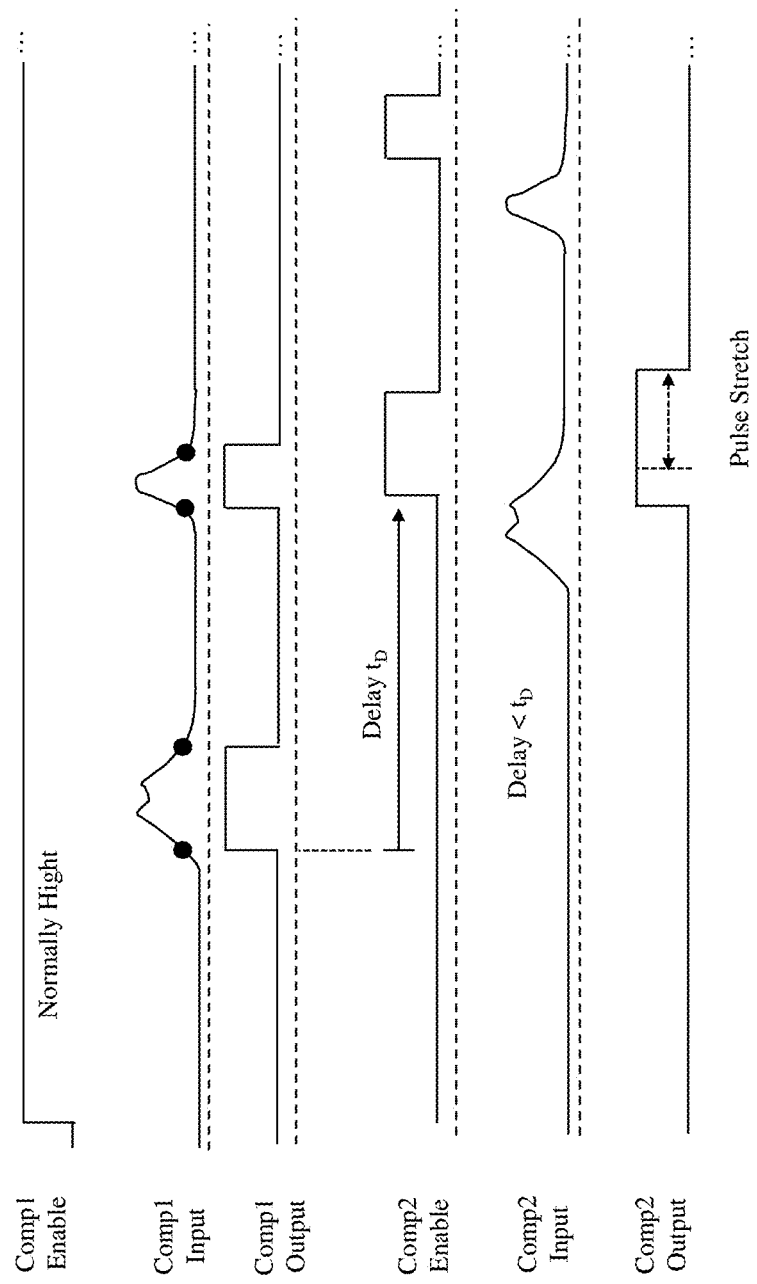

With reference to FIG. 12a, there are two comparators: Comp1 and Comp2. In this implementation, Comp1 is left enabled, while output of Comp1 enables Comp2 after a delay $t_0$. Input from the differentiator circuit (see, e.g., FIG. 10a) is provided to Comp1 using an adaptive threshold provided by the circuit of FIG. 11a. The output of Comp1 is the fed both to a lower counter and also used as an enable signal for Comp2. The differentiator output is delayed by a delay that is less than to and passed to Comp2. The output of Comp2 is then passed on to an upper counter. As a result, if a pulse-width output of the differentiator is sufficiently long corresponding to a double-photon event, Comp2 is enabled during the latter part of the pulse-width. Conversely, if the pulse-width output of the differentiator is short corresponding to a single-photon event, Comp2 is enabled after the pulse has already ended. If effect, Comp2 stretches the pulse so that the counters can accurately count the pulses. FIG. 12b is a timing diagram showing interim signals of the circuit shown in FIG. 12a. The illustrated circuit can detect two overlapping photon avalanches that result in a pulse that is longer (wider) than a "standard" pulse width of a single-photon pulse. For linearity of the measurement system, some examples identify such pulses as being two photons rather than one photon. The comparators (Comp1 and Comp2) can be single-ended- or differential-output. Various comparator technologies can be used, e.g., technologies that allow for propagation delays of hundreds of picoseconds. As shown in the illustrated example, longer pulses are counted twice: once with the lower counter on Comp 1, and once with upper counter on Comp 2. The total count is then the sum of the lower counter's count and the upper counter's count. Comp2 can only go high if the pulse is longer than one standard pulse-width, because Comp2 is only enabled once a standard pulse-width's worth of time has passed after the onset of the pulse. This can prevent double-counting of single photons while still providing accurate counting of two overlapped photon pulses. Comp2 is enabled by Comp1, after a delay. The input signal is also delayed, so that it arrives at Comp2 one standard pulse-width before Comp2 becomes enabled. Therefore, Comp 2's input signal is high when it becomes enabled only if the pulse is wider than one standard pulse-width. In some examples, the buffer and delay line introduce a delay of (td−standard pulse-width). The propagation delay "$t_D$" is the time between when the input pulse arrives at Comp 1 and when comp 2 becomes enabled. The standard pulse-width varies by device and preamp stage. In some examples, the standard pulse-width can be about 400 ps to about 900 ps.

The illustrated polarity in FIG. 12b are for illustration purposes only and is not limiting. For example, the counters can increment on an active-low or active-high clock. Suppose a positive rising pulse is applied to IN+ and a threshold is applied to IN−. The comparator will go LO→HI as the positive pulse crosses the threshold. This is appropriate for an active-high counter. For a negative pulse, the inputs would be flipped in order to continue using an active high comparator. In other implementations there may be multiple buffers or multiplexers for signal observation and sourcing which could invert the signal one or more times.

Figure 13A:
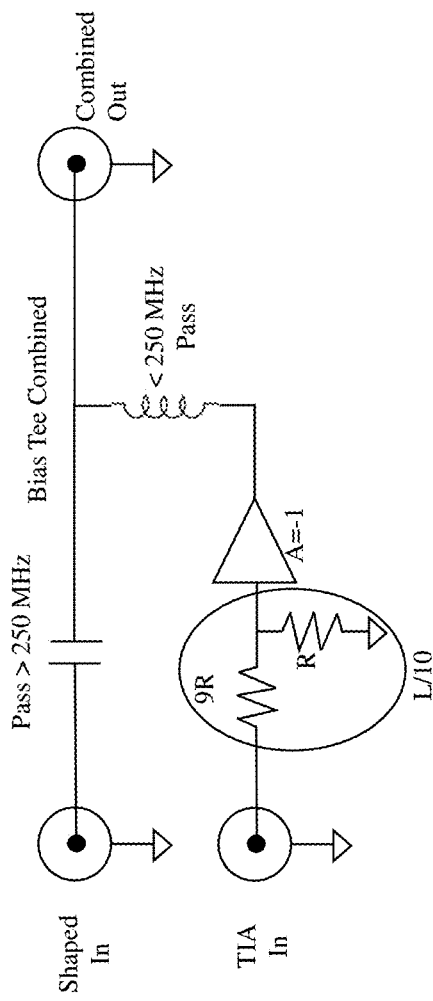
FIGS. 13a and 13b are example circuit configurations of adaptive pedestal clamping circuits.
Figure 13B:
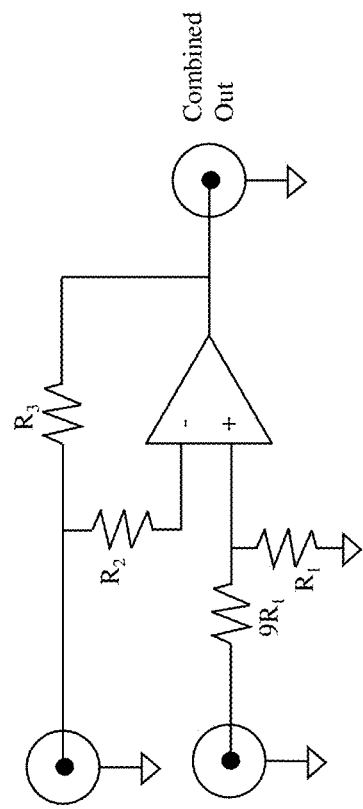

According to various embodiments, a pedestal correction factor between 0.1 and 0.15 can be used. According to various embodiments, the pedestal correction can be determined based on the light level (e.g., high vs. low) using feedback from the adaptive threshold determining unit. Referring to FIGS. 13a and 13b, example circuit configurations of adaptive pedestal clamping circuits, are provided. According to various embodiments, the illustrated circuitry can stabilize the pedestal level of short photon pulse signals. According to various embodiments, as a number of incident photons increases, signal pedestal fluctuates due to the high-pass filter. In short, the DC level of the signal rises above the original level due to high-pass filtering. However, counting photon signals without the high-pass filter can lead to level deviations and a smaller signal, which can result in the limited dynamic range of some prior schemes. Therefore, some examples count the high-pass filter or differentiator output and use pedestal clamping circuitry to reduce pedestal-level variation and to stabilize the inputs to the comparator.

Referring to FIGS. 13a and 13b, two embodiments of circuit configurations of adaptive pedestal clamping circuits are shown. In some examples, the illustrated circuitry can stabilize the pedestal level of short photon pulse signals. In some examples, as a number of incident photons increases, a signal pedestal fluctuates due to the high-pass filter. However, counting photon signals without the high-pass filter can lead to level deviations and a smaller signal, which can result in the limited dynamic range of some prior schemes. Therefore, some examples count the high-pass filter or differentiator output and use pedestal clamping circuitry to reduce pedestal-level variation and to stabilize the inputs to the comparator. In both cases of FIGS. 13a and 13b, components are chosen such that $VC_{ombined\_Out}$ is substantially 1/10 TIA-$V_{shaped\_in}$, where TIA is the transimpedance amplifier. Some examples improve the accuracy of the pedestal clamping by reducing the phase difference between the pixel-signal output and the differentiator ("HF") output. For example, components of the circuit can be adjusted, or delay lines or other delay elements added, to keep the phase shift of the electronics below the pixel pulse width. Referring to FIGS. 14a-14f, graphs of pixel out and various other operations discussed above vs. time is shown. In particular, FIGS. 14a and 14b, show values of pixel out vs. time for low photon count rate and high photon count rate, respectively. FIGS. 14c and 14d, show values of differentiation out vs. time for low photon count rate and high photon count rate, respectively. FIGS. 14e and 14f, show values of adaptive pedestal clamp vs. time for low photon count rate and high photon count rate, respectively.

With reference back to FIG. 15, a block diagram of an embodiments of the above described blocks are provided. AS discussed above, the block diagram shown in FIG. 15 is designed to operate with at least one of: an avalanche process ~100 ps, a photon pulse width <1 ns, or a quenching time greater than 20 ns or 50 ns. Although shown as connected on the anode side of the APDs, the measurement electronics can additionally or alternatively be connected on the cathode side. The output of the comparator can be used by a synchronization circuit in order the quantify photon event. It should be appreciated that the Pedestal Control block and the Adaptive Threshold block discussed above can be used alternatively or together.

Figure 16A:
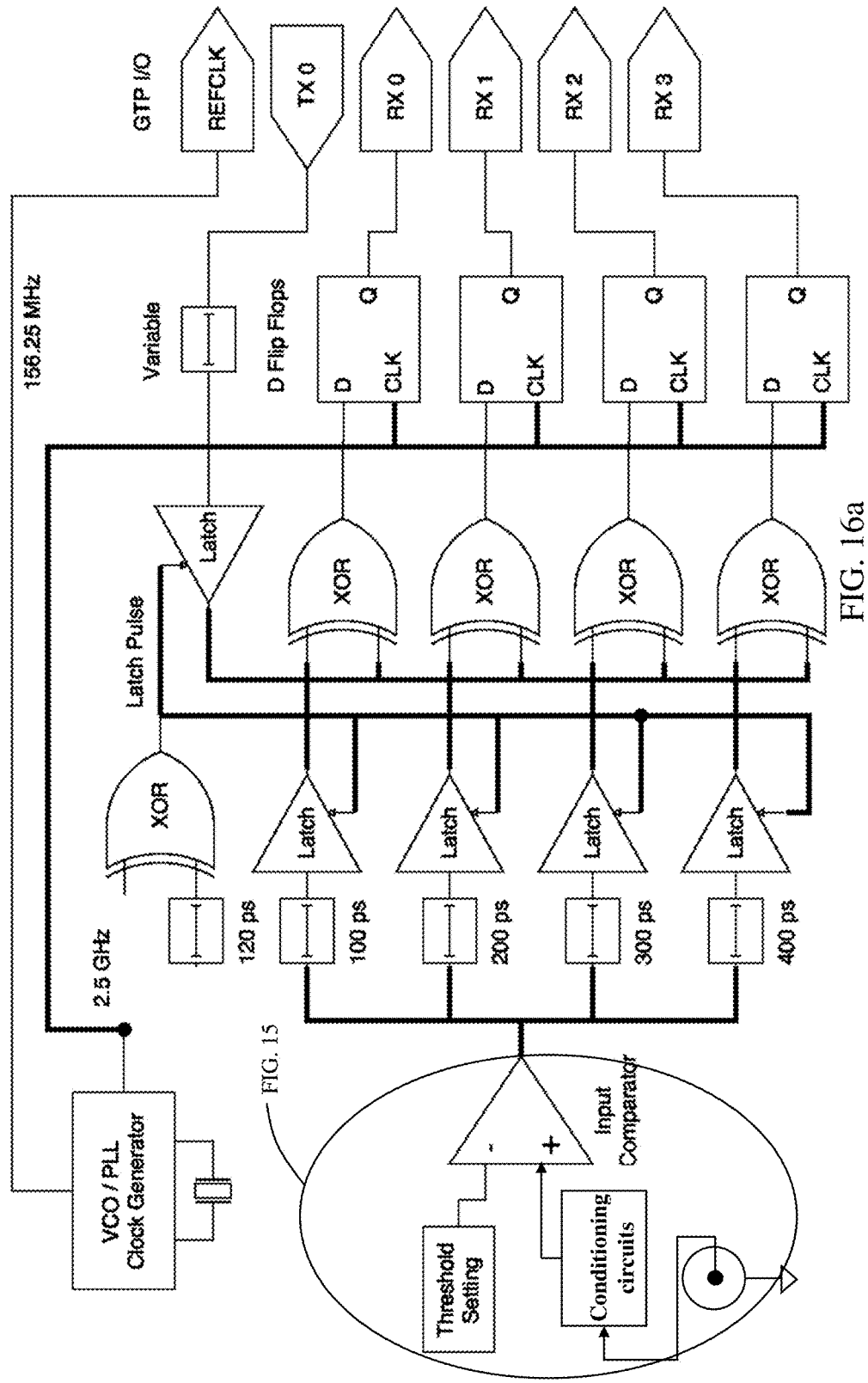
FIGS. 16a and 16b are frontend digital circuits for synchronizing an otherwise asynchronous digital signal, according to the present disclosure.
Figure 16B:
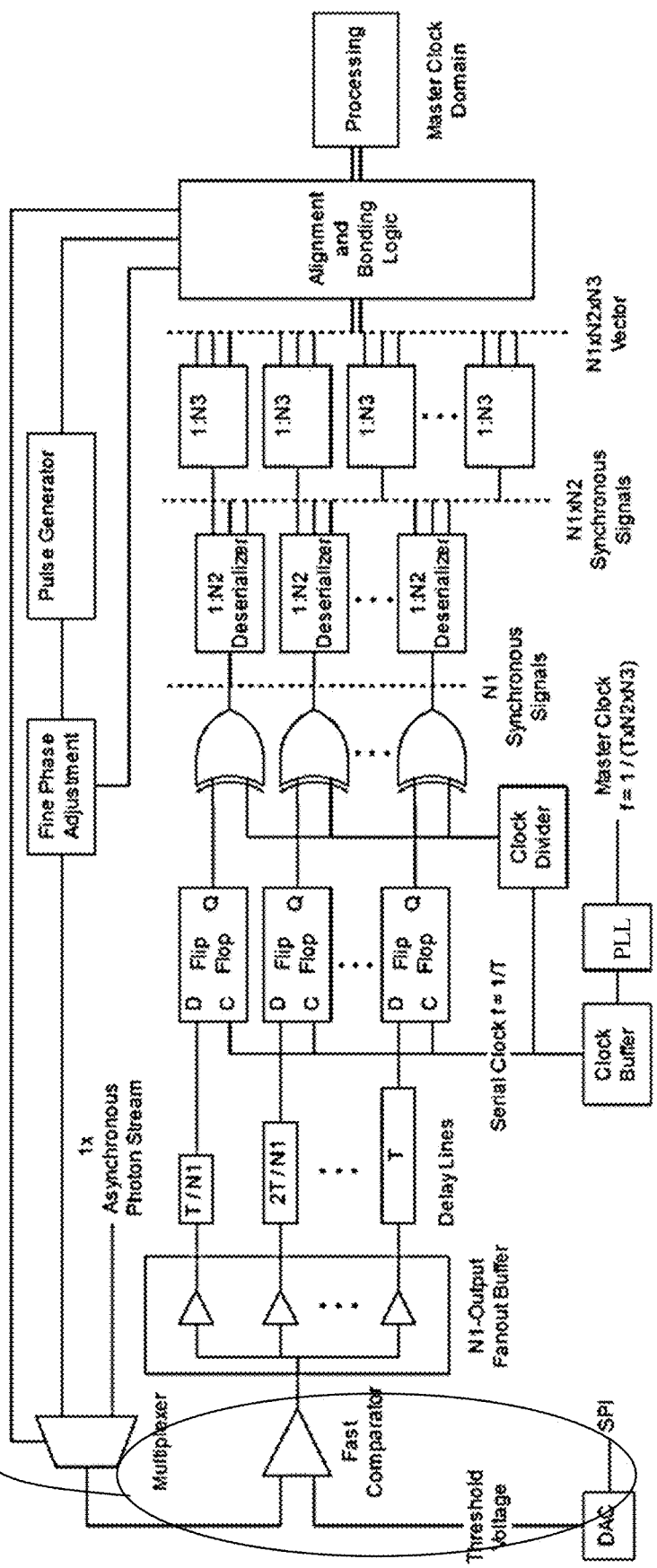

To track photon events, one needs to do so in real-time. A real-time system can compute over the photons at the same rate at which they arrive. This enables a system to continuously interpret or operate upon the material it measures, even while constrained by finite memory. Towards this end, frontend digital circuits are shown in FIGS. 16a and 16b, as alternative embodiments. The challenge FIGS. 16a and 16b resolve is that i) the digital signal arriving from the comparator is operating with 10 ps-100 ps time-varying features owing to the avalanching events. Consequently, based on the Nyquist frequency requirement, a clocking frequency for capturing such changes requires a clock in the order of 10 GHz. Available electronics may not allow for such a fast clock. Therefore, oversample approaches are presented in FIGS. 16a and 16b enabling off the shelf products to be used. Towards this end, delayed versions of the comparator output (see FIG. 15) is presented to flip flops that are responsible for clocking in the delayed comparator signals. The frontend digitizers generate four parallel 2.5 Gbps bit streams, each distributed to one of the four GTP receivers of an FPGA, thereby achieving a target of 10 Gbps throughput needed for a real-time photon accounting. It should be noted that photon counting and photon accounting are used interchangeably in the present disclosure. The implementation requires a tightly-controlled microwave design. All clock and signal paths require controlled propagation delay with a tolerance of about 10 ps, implying route distances should be adjusted within about 3 mm. In FIGS. 16a and 16b, the upstream analog circuits of FIG. 15 have been reduced to a few elements, as shown. The input comparator (responsible for output of FIG. 15) converts analog photon pulse to logic signal with <100 ps transitions. Delay lines deterministically skews the arrival of a signal so that it can be oversampled. The four clocked latches are clocked at the 2.5 GHz sampling frequency, cause stretching of the comparator output. The XOR gates can set the polarity of the latch output at runtime by controlling one input. A phase lock loop (PLL) clock generator generates 156.25 MHz reference and 2.5 GHz sampling clocks. The general principle of operation is that the input signal into the frontend is sampled by four separate circuits at 2.5 GHz each, each operating slightly out of phase (i.e., 100 ps, 200 ps, 300 ps, and 400 ps). In that way, the input signal is actually sampled by exactly one of the four circuits every 100 ps, for the 10 Gbps sampling goal. In both FIGS. 16a and 16b, XOR gates are used as a way to synchronize the 2.5 GHz clock with clocks of upstream circuitry, e.g., FPGA. The output can be provided directly to GTP receiver ports of the FPGA, however, if 2.5 GHz ports are unavailable, the clocked signals can be divided into parallel lines deserializer and presented to the FPGA as parallel outputs. Therefore, if 2.5 GHz is divided into 16 deserialized lines, each line only requires 156 MHz. This deserialization (two cascade versions) is shown in FIG. 16b. Therefore, the main blocks are: 1) oversampling by adding delays to the comparator output, 2) synchronizing an otherwise asynchronous photon digital signal to a clock having an operation frequency F (e.g., 2.5 GHz), 3) synchronizing against downstream circuits, and 4) deserializing to a predetermined number of parallel lines N each operating at F/N.

As yet another alternative embodiment (not shown), an application specific integrated circuit can replace both frontend designs shown in FIGS. 16a and 16b.

Figure 17:
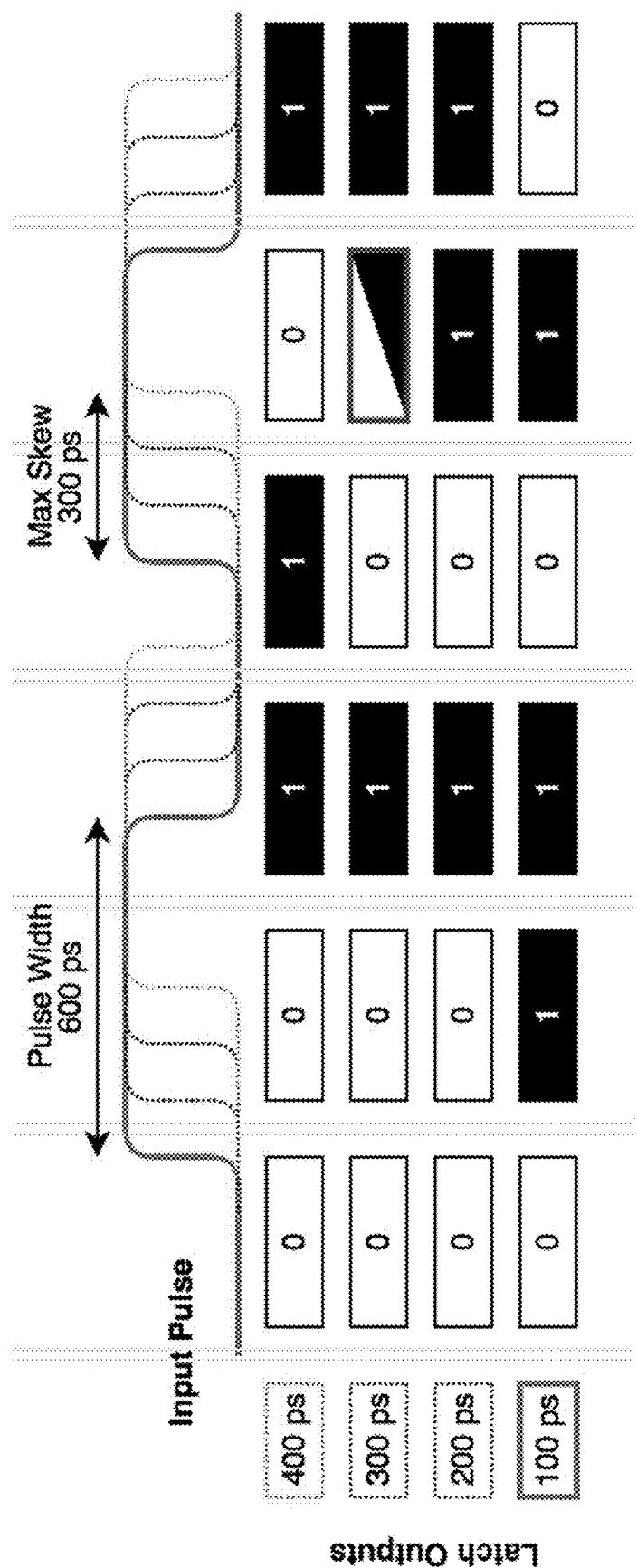

To graphically explain the operation, reference is made to FIG. 16*a* where four latches hold the value of the pulse signal at points in time 100 ps apart. While all latches are clocked simultaneously every 400 ps, the pulse signal is skewed such that it arrives at each latch exactly 100 ps after it arrived at the preceding latch. The result is a 1:4 deserialization. Referring to FIG. 17, a timing diagram is provided to show the timing relationship. In FIG. 17, the latches are shown reversed (greatest skew to least skew) because the lesser skewed latches correspond to later points in time. At any moment, the 400 ps skewed latch observes the comparator value from an earlier time, thus the 100 ps skewed latch sees a more recent value. Suppose an incoming pulse width is 600 ps. Four delayed versions are shown, first one at 100 ps, second at 200 ps, third at 300 ps, and fourth at 400 ps. A clock frequency of 2.5 GHz, translates to 400 ps period. After the first clock rising edge, all values are 0s and thus 0 is latched and clocked for all the delayed signals. At the second clock rising edge, the 100 ps delayed version is at 1 while the others remain at 0. Therefore, 1 is latched and clocked for the first delayed signal and 0s are latched and clocked for the remainder. At the third clock rising edge, all are latched and clocked at 1s. At the fourth rising edge of the clock, all are back to 0 except the fourth delayed signal (the 400 ps delayed). At the fifth rising edge of the clock, the third delayed (i.e., the 300 ps delayed signal) is changing right at the clock transition. At the last shown rising edge all delayed signals are latched at 1 except for the first delayed signal (i.e., the 100 ps delayed signal).

As shown in the fifth rising edge of the clock, if the latch is clocked near the input's transition, the value is indeterminate. The sampling uncertainty and jitter can be reduced using latches with low jitter and setup/hold time. A device such as the ADCMP582 comparator with latch-enable can fill that role.

Another alternative to the frontend digitization (not shown), includes an application specific integrated circuit (ASIC) that can clock in the comparator output at a high frequency 10 GHz. Such a circuit requires flip flops that can handle high frequencies such as 10 GHz. The ASIC further includes additional blocks, e.g., counters to identify photons and their associated arrival times.

In order to interpret information from each photon in real-time, the arrival time of every single photon is measured with some resolution, with timespan recorded or interpreted. The information contributed by each photon is limited by time resolution, but maximized by preserving the interpulse duration (IPD). As a result, the data rate is very high thus allowing for a real-time photon accounting. As an initial matter, it should be noted that a real-time system can compute over the photons at the same rate at which they arrive. This capability enables a system to continuously interpret or operate upon the material it measures, even while constrained by finite memory.

Without any compression, by storing the receiver bitstream (see output of FIGS. 16*a* and 16*b*) as raw data in memory, photons' occurrences are represented spatially as a span, a sequence of '1's in address-space corresponding to the time and duration of a photon pulse. In effect, suppose the deserialization referred to in FIG. 16*b* includes 64 lines (each operating at 2.5 GHz/64=39 MHz). These lines represent a frame.

Figure 18:
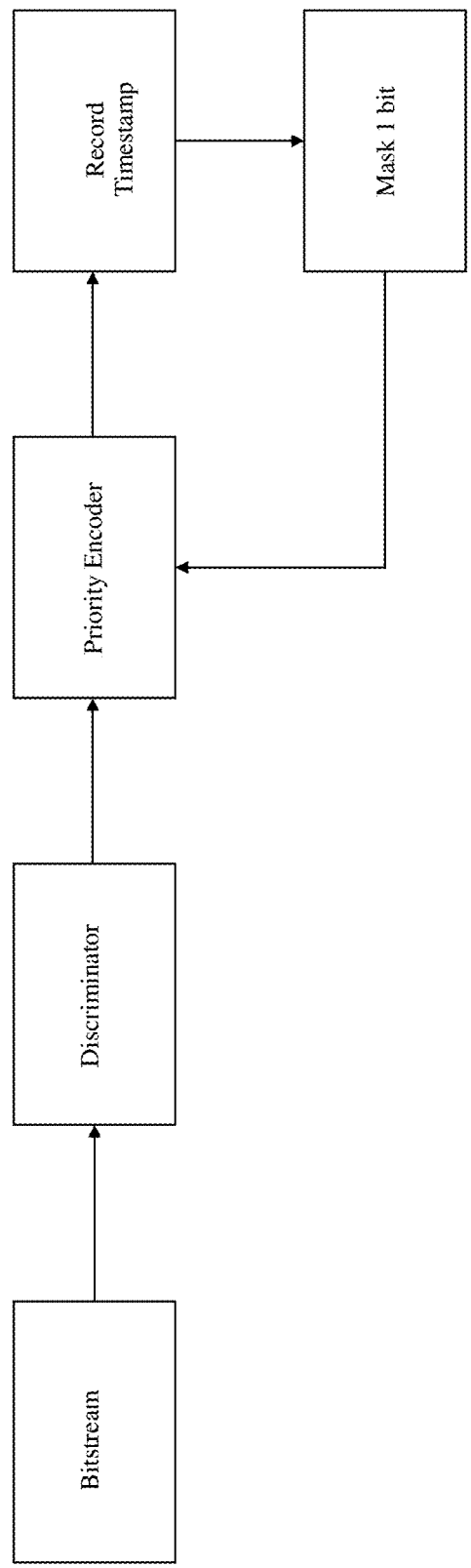
FIG. 18 is a block diagram on how the digital engine of the photon counting operates, referred to herein as the photon pipeline.

Referring to FIG. 18, a block diagram is shown on how the digital engine of the photon counting operates, referred to herein as the photon pipeline. A bitstream representing a frame is presented to a discriminator block that is configured to seek for a 0 to 1 transition and provide a shadow timestamped data with all values 0s except where the transitions from 0 to 1 occur. The encoder provides a digital value as to where the first 1 in each block is based on a priority encoder. This encoded output is then recorded as a timestamp as the time associated with a photon. Next, the bit which was just encoded is masked, and the process repeated from the encoder block until all photons in the frame are accounted for.

Figure 19:
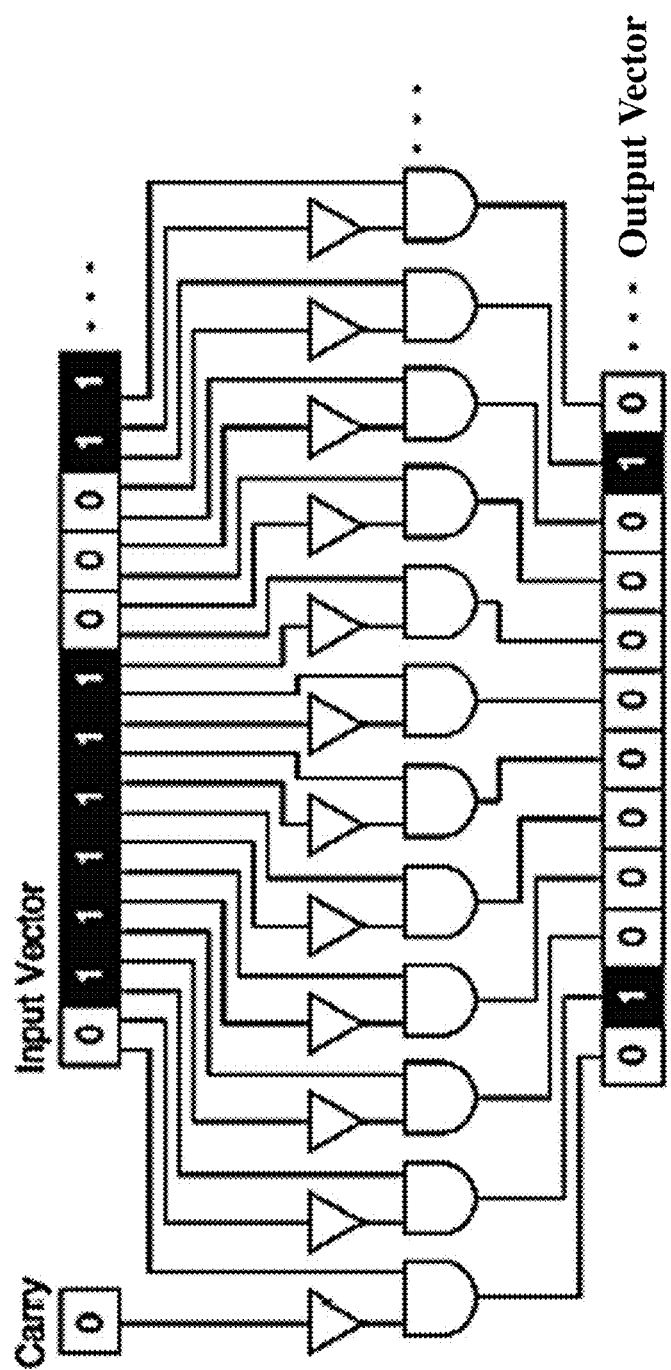
FIG. 19 is an example discriminator circuit of the block shown in FIG. 18, using a first discrimination criterion.

Referring to FIG. 19, an example discriminator circuit is shown. The discriminator receives an input bitstream identified as input vector. Based on its logic gates, it is configured to seek out 0-1 transitions. A 0-1 transition, represents arrival of a photon in digital values. The photon may remain for several is before the input bitstream goes back to 0s. In the illustrated embodiment of FIG. 19, the first bit of the input bitstream, is 0 while the second bit is a 1, representing a 0-1 transition. The output of the discriminator then creates a shadow bitstream, referred to as output vector, which toggles from 0 to 1 between the associated bit positions. In the input bitstream, the next 5 position retain 1s, indicating the persistence of the photon pulse. Thus, in the shadow bitstream, 0s are placed in these positions. In the next three positions of the input vector, 3 0s are provided, indicating no photon activities. Similarly, in the shadow bitstream, the next 3 position are 0s. In the input bitstream, the next two positions are is indicating a transition from a 0-1, indicative of an arrival of a new photon. Again, in the shadow bitstream, the transition from 0-1 of the input bitstream is represented by a 0-1 transition as well, followed by a 0. Thus for an input bitstream of 011111100011, an output vector of 010000000010 is generated out of the discriminator.

Figure 20:
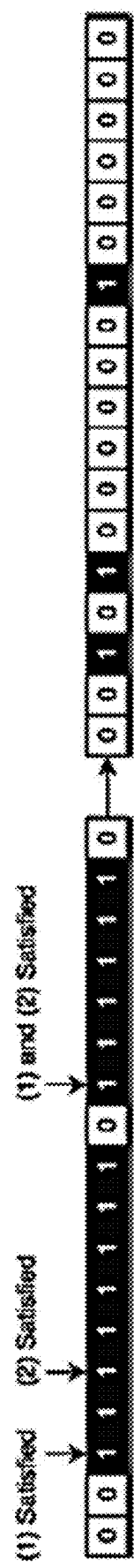
FIG. 20 is an example bitstream of another discrimination criterion.

Alternatively, pulse discrimination can be based on more complex characteristics. For example, if there are long stretches of is followed by a 0, could be related to overlapping pulses. For example, a 1 followed by 5 is followed by a 0 may also cause the discriminator to provide a 1. Referring to FIG. 20, this additional discrimination criterion can be seen. For example, the usual condition (1) is met when there is a 0-1 transition. However, a second condition is met on a 1 because of 5 follow-on is followed by a 0. In a third situation both above conditions are met.

Figure 21:
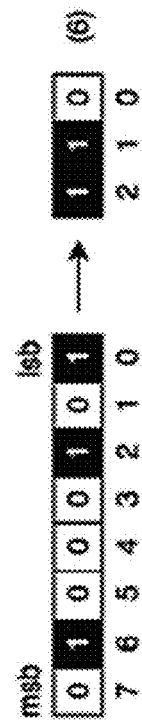
FIG. 21 is a bitstream showing the operation of the priority encoder shown in FIG. 18.

Next, according to FIG. 21, a bitstream for a priority encoder is shown which provides positional values of the is in respective priority positions. For example, a byte having 8 bits (01000101) is passed through the priority encoder with the left most 1 set as priority, thereby multiple is would not cause an indeterminate output. As a result, the output represents the value of 6 representing 1 in the $6^{th}$ position, the left most 1. Thus, the output of the priority encoder is 6 (i.e., 110). This positional value is recorded as the timestamp of the photon arrival in the bitstream. Next, the bit that provided the output is masked and the priority encoder is rerun on 00000101. This time with position 6 masked, the next position is position 2. The priority encoder's output is then 2, and so on.

Figure 22:
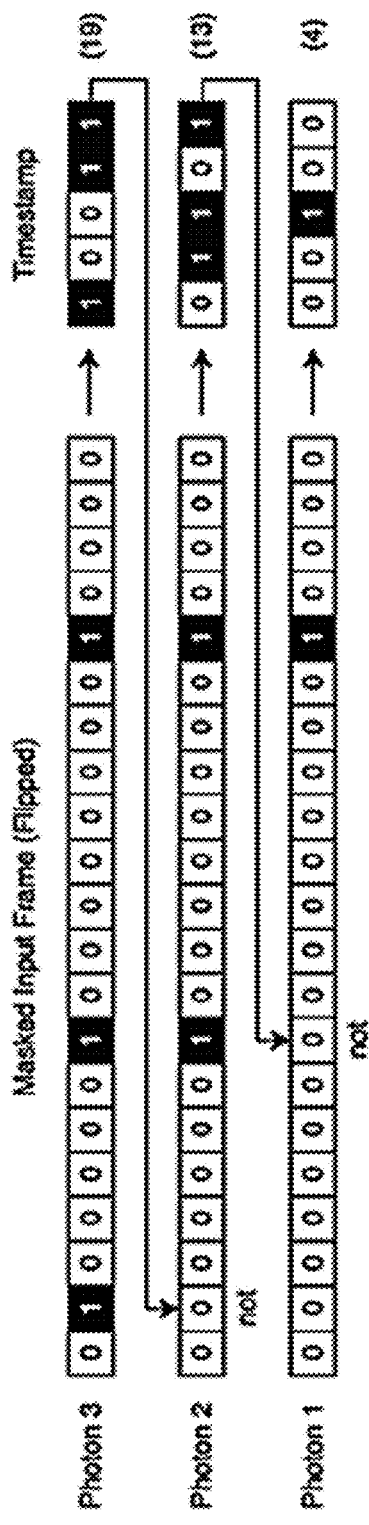
FIG. 22 is a series of bitstream showing exemplary operation of the priority encoding and masking.

Referring to FIG. 22, exemplary operation of the priority encoding and masking are shown for a longer bitstream. There are 21 positions (from right to left: bit positions 0 to bit position 20). In the first round out of the priority encoder, the 1 in position number 19 is chosen, resulting in an output of 10011. Next the bit in position 19 is masked and the priority encoder operates on the new bitstream. The new bitstream's most significant position occupying a 1 is the position 13, resulting in an output of 01101. Next, the 1 in position 13 is masked, leaving only the 1 in position 4. Passing this new bitstream through the priority encoder results in 00100. The result of the recordings from the priority encoder's output as timestamps is the timing associated with each photons that can be used to further enhance the understanding of flow cytometry.

Additional information related to timestamping is provided in Appendix-A attached hereto.

Figure 23:
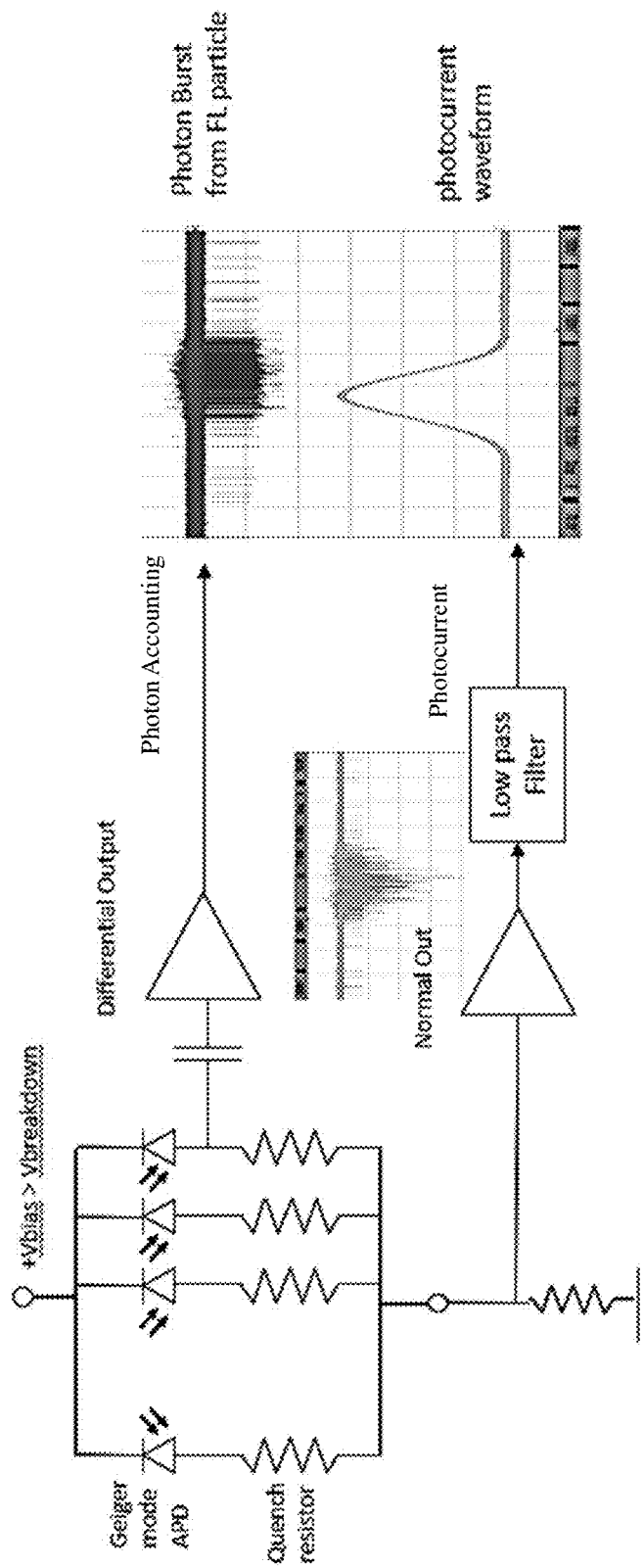
FIG. 23 is a circuit showing the capability to perform photon accounting at the same time as (simultaneously) as photocurrent detection.

As discussed above, the system of the present disclosure is capable of simultaneously providing photocurrent data as well as photon accounting. The photon accounting is described above. As for the photocurrent measurements, reference is made to FIG. 23. The path identified as photon accounting is fully described above. The path identified as photocurrent can be pursued simultaneously. Thus, when a particular Geiger mode APD encounters a photon, a differential output (D-Out) connected to the Geiger mode APD may issue a photon burst, as shown in purple on the right of FIG. 23. When any of the Geiger mode APDs encounters photon(s), the "normal" out (N-Out) may emit a photocurrent waveform. A low pass filter may be coupled with the normal out, as indicated in FIG. 23. Thus, a Gaussian waveform can be generated from the photocurrent path.

In some cases, the photon burst and the photocurrent waveform can be detected simultaneously, or virtually simultaneously. In some examples, one or more photons (Joules) and derivative photon current (coulomb/sec) can be detected simultaneously, such as by using the example circuit illustrated in FIG. 23. Certain examples described herein make it possible to detect all photon signal with the a relatively high sensitivity before the derivative photon current is obtained (Rayleigh, Raman, AFL).

While, the simultaneous photocurrent measurement and single-photon accounting can be performed, and the photocurrent can generate the familiar Gaussian distribution as shown in FIG. 23, the single-photon accounting pathway can also be used to generate a similar Gaussian Profile. Towards this end, a moving average with a selectable window size can be used and overlaid over the photon timestamps. The resulting Gaussian distribution is similar to the Gaussian distribution of the photocurrent pathway of FIG. 23 when there are sufficient number of photons.

Figures 24, 25:
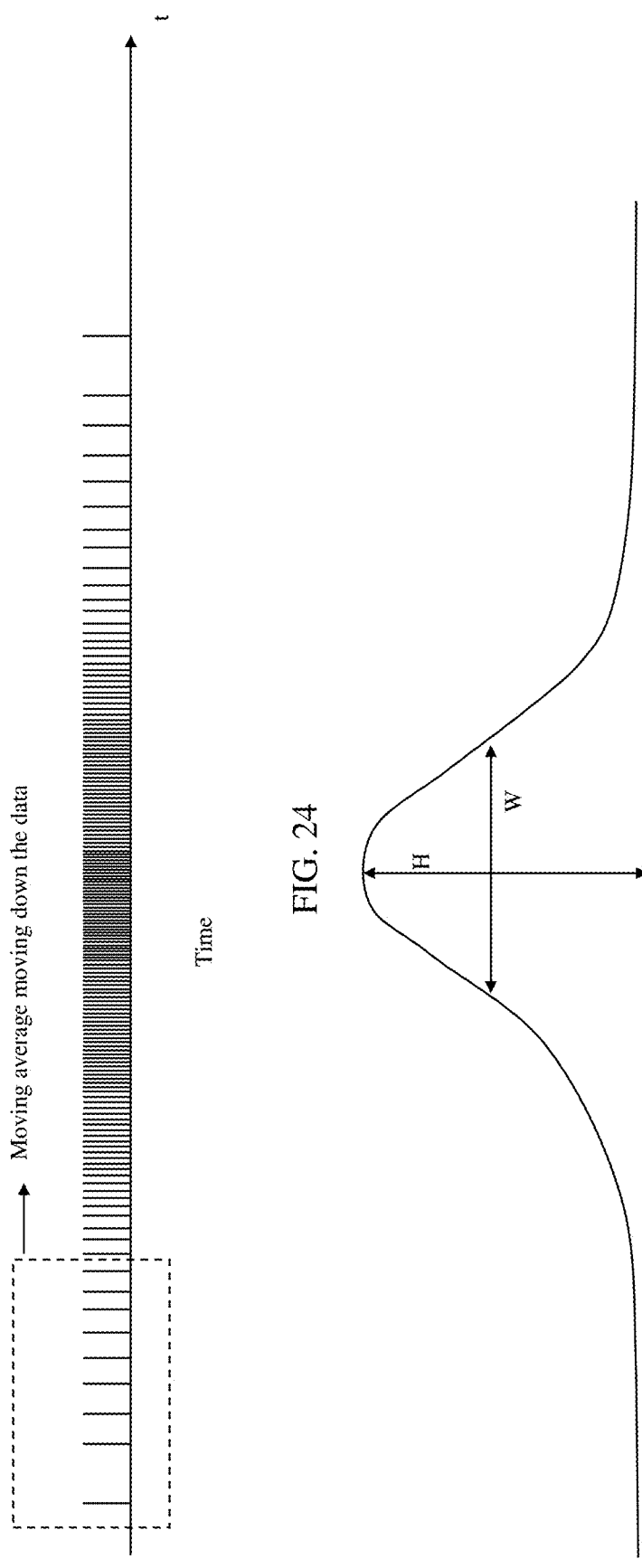
FIG. 24 is a schematic of how each photon is timestamped in memory.
FIG. 25 is a Gaussian graph showing the output of application of a moving average filter to the timestamped photons of FIG. 24.

Generally, when measuring light, the intensity or power of the signal corresponds to the rate of photon arrivals. In a photocurrent measurement regime, the rate can be measured instantaneously in the form current or voltage. With discrete photon counting the rate of photon arrivals can be characterized via the average time between arrivals or equivalently, the total of photons within some time interval. With the photon information available, it is possible to measure the number of photons over an arbitrary interval of time. Towards this end, a moving average window can be implemented. As a result the photon arrivals within a time interval are measured which provide an instantaneous rate=total/time. Next, the interval is shifted forward in time by some length less than the window length. Such a moving average subtracts earlier photons from the total, and adds more recent photons, reflecting a more recent rate value. Referring to FIGS. 24 and 25, the moving average operation is shown graphically. In FIG. 24, each photon is timestamped in memory. As the intensity of the light source is increased, rate of photons arrival increases. A moving average plot can provide a Gaussian distribution similar to the photocurrent measurement. As for the moving average input, two parameters of are interest: sampling rate (fs) which is one over sampling period (Ts), which correlates to the frequency at which the output is updated, and window length (Tw), i.e., the length of time over which the photons are considered. The window length must be long enough to gather sufficient photons to make a rate measurement of sufficient accuracy. The choice of Tw is also based on signal to noise ratio and avoidance of unintended averaging of higher frequency components.

The moving average filter can be applied cyclically as in a circular buffer until sufficient smoothness is achieved.

In implementing the moving average, a self-triggering scheme can be implemented to alert of a significant likely measurement event. For example, if the average background photon count "Nb" over one window length is known, a threshold can be set at 3-sigma above the background count Nb+(3*sqrt (Nb)). When the moving window output is above that threshold value it indicates an extremely likely measurement event. That can alert downstream analyses to begin recording photon data. Similarly, as the threshold crossing indicates the start of some measurement event, and the end of the event is when the count drops down below the threshold again, indicating the end of the measurement event. Such a trigger can be provided to downstream analyses tools to begin and end analysis of the photons. In order to avoid discarding photons just below the first threshold crossing (indicating start of an event) and just after the second threshold crossing (indicating end of the event), photon information prior to and after the threshold crossings are maintained in memory. For example, an additional array of circular buffers can be used to hold the bit-stream. Each circular buffer records the latest photon data each cycle. At the end of an event, one of the circular buffers can be halted, and the data transmitted to another CPU starting from some # of cycles prior to the original threshold crossing. In other cases the photon stream may need to be processed in real-time, rather than buffered and transferred. In that case, the stream can be delayed by an arbitrary number of cycles using RAM or register layers, so that when the threshold crossing occurs, the processing logic is initiated, and it is initially presented with photon data slightly before the threshold crossing.

Figure 26:
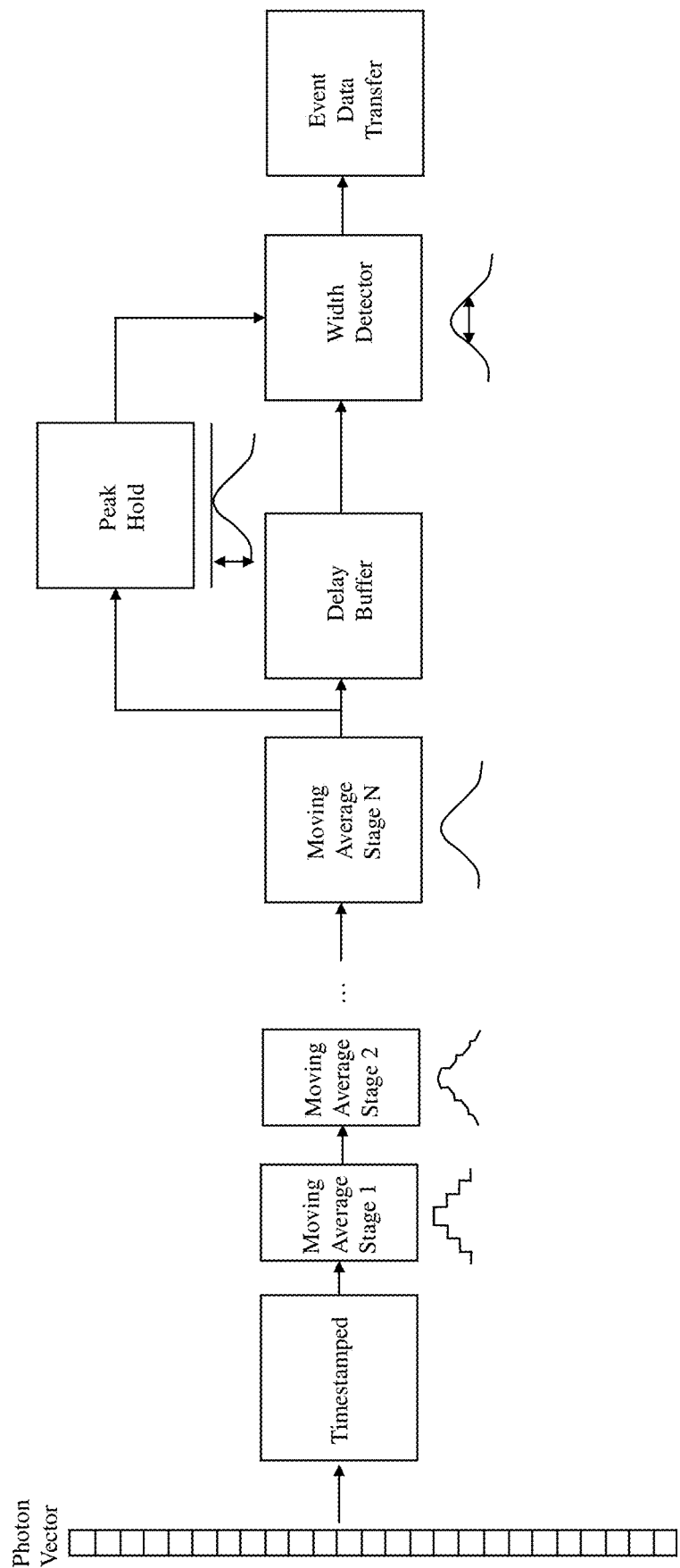
FIG. 26 is a schematic of a peak/width detection utilizing a cascade of moving average filters (1 . . . N stages).

Two parameters of interest from the Gaussian distribution are: Width and Height of the Gaussian distribution. These parameters can be used to provide a feedback signal to the light source to control the intensity in a feedback control scheme. Referring to FIG. 26, a schematic of a peak/width detection is shown utilizing a cascade of moving average filters (1 . . . N stages). A cascade of moving average filter advantageously uses RAM and simple adders/subtractors rather than processor resources for alternative filter schemes, such as finite impulse response (FIR) filters, known to a person having ordinary skill in the art. Accordingly, as shown in FIG. 26, the output of the pseudo-LPF (i.e., cascaded moving average filters) can be passed to a peak-hold circuit which will capture the maximum value following a threshold-crossing event discussed above. The half-max width can be computed from the number of cycles until half-max is reached as the signal declines following the peak-hold. The resolution of width measurement is limited to the sample rate of the moving average, for example 10 ns. If greater resolution is needed, a moving average with Sub-clock-cycle resolution may be implemented.

As discussed above, a specialty photodiode filter is also within the scope of the present disclosure. Such a sensor is similar to the sensor array shown in FIG. 6a or 6b. However, instead of using quench resistors for causing decay of signal, an active approach may be used. Such an approach replaces some or all of the quench resistors with switches, e.g., FETs, such that when the avalanche period (on the order of 10 ps-100 ps) has ended, the diode is quickly recharged using a switch, rather than relying on the natural decay based on the RC constant. Such an approach allows more photons to be arriving without saturating the differentiator shown in FIG. 15. According to another embodiment, in addition, the front-end circuit shown in FIGS. 16a and 16b (alternative approaches) or other approaches discussed herein with regards to use of an ASIC and clocking the photon signals at high rate (e.g., 10 GHz) using flip flops, can also be integrated in such a sensor. According to yet another embodiment, the asynchronous-synchronous conversion of the data into timestamped photon event and the circuitry associated therewith (see FIGS. 18-22) can also be integrated into the same ASIC, which will advantageously avoid crosstalk, and other communication issues common in high-speed transference of data. According to yet another embodiment, the simultaneous photocurrent and photon accounting discussed herein and the associated circuitry discussed above (including reference to FIG. 23) can also be implemented in such a sensor. Finally, and according to yet another embodiment, data associated with the timestamped photons which are typically held in RAM, can be placed in RAM or alternatively transferred to non-volatile memory (e.g., FLASH) onboard the sensor ASIC. Still according to yet another embodiment, feedback control of the light source discussed above, based on photon accounting can be used to control the light source and the intensity of the light source. Such an ASIC allows portability and improvement of flow cytometers tremendously by allowing existing flow cytometers to be retrofitted with a highly capable sensor ASIC capable of not only providing traditional photocurrent data, but also provide an accounting of each photon as well as control of the light source.

Those having ordinary skill in the art will recognize that numerous modifications can be made to the specific implementations described above. The implementations should not be limited to the particular limitations described. Other implementations may be possible.

The invention claimed is:

1. A photon-accounting system for use with a flow cytometry system, comprising:
   a signal shaping sub-system, including:
      a differentiator configured to be coupled to one or more Geiger-mode photodiodes providing a capacitively coupled signal from the Geiger-mode photodiodes, the signal from the one or more Geiger-mode photodiodes comprising a combination of avalanche portions and recharge portions associated with receiving photons overlaid on one-another, the differentiator configured to generate a differentiated output of the signal into corresponding zero-crossings each associated with one of the received photons, wherein each of the zero-crossings refers to the differentiated output as a signal of voltage vs. time crossing a zero volt level;
      a comparator configured to receive the differentiated signal and compare to a threshold to thereby generate a comparator output digital signal associated with crossings of the differentiated signal about the threshold;
   a front-end synchronization system adapted to receive and synchronize the comparator generated digital signal to a clock, thereby generate synchronized photon data with the clock and associated with the asynchronized Geiger-mode photodiodes signal; and
   a timestamping system adapted to receive the synchronized data as a bit stream and generate a timestamp associated with each photon.

2. The photon-accounting system of claim 1, the capacitively coupled signals represent a capacitively coupled signal from each diode to a common node which is then coupled to the differentiator.

3. The photon-accounting system of claim 1, the capacitively coupled signals represent a high pass filter from a common node to the differentiator, the common node coupled to each of the Geiger-mode photodiodes through an associated quench resistor.

4. The photon-accounting system of claim 1, the signal shaping sub-system further comprising an active pedestal controller coupled to the differentiator adapted to monitor and correct DC variance from a zero V baseline present on the differentiated output.

5. The photon-accounting system of claim 1, the signal shaping sub-system further comprising an adaptive threshold controller configured to adaptively adjust the threshold utilized by the comparator based on the DC variance from a zero V baseline present on the differentiated output utilizing an enveloped detector circuit.

6. The photon-accounting system of claim 1, the front-end synchronization system comprising a plurality of delayed versions of the comparator output digital signal synchronized with the clock and deserialized to thereby provide a predetermined number of parallel lines associated with the comparator output digital signal.

7. The photon-accounting system of claim 6, the synchronization with the digital clock is accomplished with a plurality of flip flops, one for each of the plurality of delayed versions of the comparator output digital signal.

8. The photon-accounting system of claim 1, the timestamping system comprising a discriminator adapted to receive the bitstream and identify photon events based on predetermined criteria including a transition from a 0 to 1 indicative of an arrival of a photon, and upon identifying a photon even provide a flag including a 0 to a 1, indicative of the photon event;
   a priority encoder adapted to identify position of the flag in the bitstream and provide positional information about the flag, and
   a recorder adapted to record the positional information as the timestamp.

9. The photon-accounting system of claim 8, the timestamping system further comprising a masker adapted to mask the flag and repeat the encoding and the recording until all flags are recorded in the bitstream as timestamped data.

10. The photon-accounting system of claim 9, further comprising a post-processing system adapted to receive the timestamped data and apply a moving average filter with a selective window.

11. The photon-accounting system of claim 10, the post-processing system further comprising an adaptive trigger system comprising a threshold-selector adapted to set a background threshold based on background photon data such that when the moving average filter indicates a signal above the background threshold an output is generated to indicate a photon even and when the moving average filter indicates a signal below the background threshold the output signal indicates end of the photon event, wherein the output signal can be used as a trigger data to record photon data.

12. The photon-accounting system of claim 11, the post-processing further comprising a cascade of moving averages with a selective window adapted to be applied to the recorded bitstream to thereby smooth out the recorded bitstream and generate filtered bitstream.

13. The photon-accounting system of claim 12, further comprising a Gaussian profile detector comprising a peak detector and a width detector adapted to provide peak and width of a Gaussian profile of the filtered bitstream.

14. The photon-accounting system of claim 3, further comprising:
- a simultaneous photocurrent detection system adapted to receive Geiger-mode photodiodes signals from the common node, the photocurrent detection system comprising:
- a buffer coupled to the common node; and
- a lowpass filter adapted to remove high frequency components, wherein the output of the lowpass filter provides the photocurrent output.

* * * * *